(12) United States Patent
Takenaka et al.

(10) Patent No.: US 7,530,410 B2
(45) Date of Patent: May 12, 2009

(54) LEGGED MOBILE ROBOT AND CONTROL SYSTEM THEREOF

(75) Inventors: Toru Takenaka, Wako (JP); Hiroshi Gomi, Wako (JP); Susumu Miyazaki, Wako (JP); Kazushi Hamaya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 331 days.

(21) Appl. No.: 10/593,493

(22) PCT Filed: Feb. 18, 2005

(86) PCT No.: PCT/JP2005/002561

§ 371 (c)(1),
(2), (4) Date: Sep. 20, 2006

(87) PCT Pub. No.: WO2005/090009

PCT Pub. Date: Sep. 29, 2005

(65) Prior Publication Data

US 2007/0193789 A1    Aug. 23, 2007

(30) Foreign Application Priority Data

Mar. 23, 2004    (JP) .............................. 2004-085601

(51) Int. Cl.
*B62D 51/06* (2006.01)
*B25J 5/00* (2006.01)
(52) U.S. Cl. .................... 180/8.1; 180/8.2; 180/8.5; 180/8.6; 180/6.5; 318/568.12; 901/1; 901/2
(58) Field of Classification Search ............. 180/8.1, 180/8.2, 8.5, 8.6, 6.5; 318/568.12
See application file for complete search history.

(56) References Cited

U.S. PATENT DOCUMENTS 5,455,497 A * 10/1995 Hirose et al. ........... 318/568.12

(Continued)

FOREIGN PATENT DOCUMENTS

EP    1 477 283 A1    11/2004

(Continued)

OTHER PUBLICATIONS

European Search Report, PCT/JP2005002561 dated Apr. 17, 2008.

*Primary Examiner*—Paul N Dickson
*Assistant Examiner*—Marlon A Arce
(74) *Attorney, Agent, or Firm*—Squire, Sanders & Dempsey L.L.P.

(57) ABSTRACT

The legged mobile robot the foot comprises a foot main body connected to each leg, a toe provided at a fore end of the foot main body to be bendable with respect to the foot main body, and a bending angle holder capable of holding a bending angle of the toe in a bendable range of the toe. In addition, a legged mobile robot control system is configured to hold the bending angle of the toe at a first time point which is a liftoff time of the leg from a floor or earlier thereof, and to release the bending angle at a second time point after the leg has lifted off the floor to restore the toe to a initial position. With this, the bending angle at the time of liftoff can continue to be held after liftoff, whereby the robot can be prevented from becoming unstable owing to the toe contacting the floor immediately after liftoff. In addition, stability during tiptoe standing can be enhanced.

9 Claims, 33 Drawing Sheets

U.S. PATENT DOCUMENTS

| | | | |
|---|---|---|---|
| 6,992,457 B2 * | 1/2006 | Furuta et al. | 318/568.12 |
| 2005/0077856 A1 * | 4/2005 | Takenaka et al. | 318/568.12 |
| 2005/0088131 A1 * | 4/2005 | Furuta et al. | 318/568.12 |

FOREIGN PATENT DOCUMENTS

| | | |
|---|---|---|
| JP | 9-94785 | 4/1997 |
| JP | 2003-236777 | 8/2003 |
| JP | 2003236782 | 8/2003 |

* cited by examiner

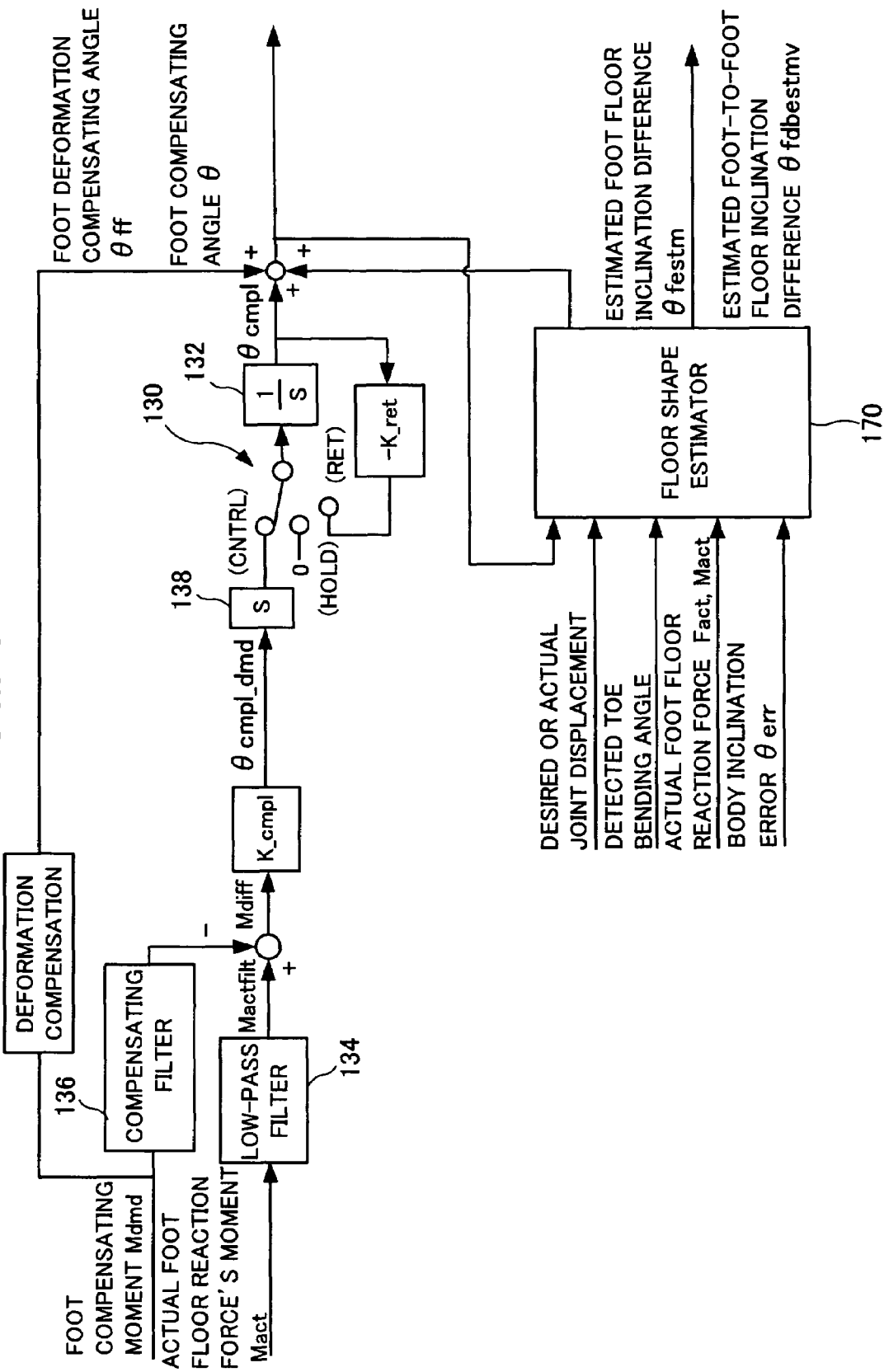

LEGGED MOBILE ROBOT AND CONTROL SYSTEM THEREOF

TECHNICAL FIELD

This invention relates to a legged mobile robot and a control system thereof, more particularly to a legged mobile robot whose feet are provided with bendable toes.

BACKGROUND ART

Techniques have previously been proposed for providing the feet of a legged mobile robot with bendable toes. Examples of this type of legged mobile robot include, for example, the technology set out in Patent Reference 1. In the technology according to Patent Reference 1, a configuration is adopted which provides a vertically rotatable toe formed at the fore end of the foot and a lock mechanism for locking rotation of the toe at the position where the bending angle of the toe is zero degree (substantially horizontal) and ensures the required contact area at floor contact by locking the rotation of the toe before the leg touches down and the toe is retractively rotated (bent) during toe-off by releasing the lock before the leg lifts off.

Patent Reference 1: Japanese Laid-open Patent Application No. 2003-236777 (particularly paragraphs 0011, 0012, FIG. 2 and FIG. 10)

DISCLOSURE OF THE INVENTION

Problems to be Solved by the Invention

However, in the aforesaid prior art according to Patent Reference 1, because the toe is in a free (rotatable) state when the leg lifts off, the toe resumes its original position (zero degree bending angle position) after liftoff, so that the toe is liable to contact the floor to make the robot's posture unstable.

Moreover, when a long tiptoe standing period occurs at the late stage of the supporting leg, such as during stair climbing, a problem arises in that stable posture control is difficult to achieve if the toe is in the free state.

Therefore, the object of this invention lies in overcoming the aforesaid problems and in providing a legged mobile robot and a control system thereof which prevents posture destabilization by the toes contacting the floor immediately after liftoff and improves stability during tiptoe standing.

Means for Solving the Problems

In order to achieve the object, as recited in claim 1 mentioned below, this invention is configured to have a legged mobile robot having a body and legs whose upper ends are connected to the body and whose lower ends are each connected to a foot to be movable when the legs are driven, characterized in that the foot comprises a foot main body connected to each of the legs, a toe provided at a fore end of the foot main body to be bendable with respect to the foot main body, and a bending angle holder capable of holding a bending angle of the toe in a bendable range of the toe from zero degree at which a contact area of the foot becomes maximum to a predetermined degree, the bending angle holder holding the toe at the bending angle comprising one from among the zero degree, the predetermined degree and an arbitrary angle between the zero degree and the predetermined angle.

Further, as recited in claim 2 mentioned below, this invention is configured to further include a bending angle change suppressor that suppresses change of the bending angle of the toe.

Further, as recited in claim 3 mentioned below, this invention is configured such that the toe is made continuous with the foot main body and is made of an elastic material that bends with flexing.

Further, as recited in claim 4 mentioned below, this invention is configured such that the toe is connected to the fore end of the foot main body through a rotational shaft capable of rotating about a pitch axis.

Further, as recited in claim 5 mentioned below, this invention is configured to further include an urging means for urging the toe in a direction of restoring it to an initial position.

Further, as recited in claim 6 mentioned below, this invention is configured such that the bending angle holder comprises a friction brake.

Further, as recited in claim 7 mentioned below, this invention is configured such that the bending angle change suppressor comprises a damper.

Further, as recited in claim 8 mentioned below, this invention is configured such that the bending angle holder and the bending angle change suppressor comprise a friction brake whose frictional force is made adjustable.

Further, as recited in claim 9 mentioned below, this invention is configured such that the bending angle holder and the bending angle change suppressor comprise a damper.

Further, as recited in claim 10 mentioned below, this invention is configured to have a system for controlling a legged mobile robot having a body and legs whose upper ends are connected to the body and whose lower ends are each connected to a foot to be movable when the legs are driven, the foot having a foot main body connected to each of the legs and a toe provided at a fore end of the foot main body to be bendable with respect to the foot main body, characterized by a bending angle holder capable of holding a bending angle of the toe in a bendable range of the toe, and a bending angle controlling means for operating the bending angle holder to control holding and releasing of the bending angle of the toe, the bending angle controlling means holding the bending angle of the toe at a first time point which is a liftoff time of the leg from a floor or earlier thereof, and releasing the held bending angle of the toe at a second time point after the leg has lifted off the floor to restore the toe to a initial position.

Further, as recited in claim 11 mentioned below, this invention is configured to further include a gait generating means for generating a gait of the robot, and the bending angle controlling means determines the first time point and the second time point based on the generated gait.

Further, as recited in claim 12 mentioned below, this invention is configured to further include a bending angle detecting means for detecting the bending angle of the toe, and a gait generating means for generating a gait of the robot, and the bending angle controlling means determines the first time point based on the detected bending angle and determines the second time point based on the generated gait.

Further, as recited in claim 13 mentioned below, this invention is configured such that the bending angle controlling means holds the bending angle of the toe at a third time point during liftoff of the leg from the floor, which is later than the second time point, and releasing the held bending angle of the toe at a fourth time point, after the leg has landed on the floor, which is earlier than the first time point at a next time.

Further, as recited in claim 14 mentioned below, this invention is configured to further include a gait generating means for generating a gait of the robot, and the bending angle controlling means determines the first to fourth time points based on the generated gait.

Further, as recited in claim 15 mentioned below, this invention is configured to further include a bending angle detecting means for detecting the bending angle of the toe, and a gait generating means for generating a gait of the robot and the bending angle controlling means determines the first and third time points based on the detected bending angle, and determines the second and fourth time points based on the generated gait.

Further, as recited in claim 16 mentioned below, this invention is configured to further include a bending angle change suppressor that suppresses change of the bending angle of the toe, and the bending angle controlling means releases the held bending angle of the toe at the second time point to gradually restore the toe to the initial position by operating the bending angle change suppressor to reduce the bending angle progressively.

Further, as recited in claim 17 mentioned below, this invention is configured to further include a bending angle change suppressor that suppresses change of the bending angle of the toe, and the bending angle controlling means operates the bending angle change suppressor from the fourth time point to the first time point at the next time to control a floor reaction force acting to the robot through the foot.

Further, as recited in claim 18 mentioned below, this invention is configured to further include a bending angle change suppressor that suppresses change of the bending angle of the toe in accordance with a predetermined resistance characteristic set with respect to angular velocity of the bending angle, and the bending angle controlling means manipulates a position or posture of the foot from the fourth time point to the first time point at the next time to regulate the bending angular velocity of the toe, thereby varying magnitude of resistance produced by the bending angle change suppressor to control a floor reaction force acting to the robot through the foot.

Further, as recited in claim 19 mentioned below, this invention is configured to further include a bending angle change suppressor that suppresses change of the bending angle of the toe; a bending angle detecting means for detecting the bending angle of the toe, and a floor shape estimating means for estimating shape of the floor on which the foot is based on at least the detected bending angle, and the bending angle controlling means operates the bending angle change suppressor from the fourth time point to the first time point at the next time based on at least the estimated shape of the floor to control a floor reaction force acting to the robot through the foot.

Effects of the Invention

Since the legged mobile robot recited in claim 1 is configured such that the foot comprises a foot main body connected to each of the legs, a toe provided at a fore end of the foot main body to be bendable with respect to the foot main body, and a bending angle holder capable of holding a bending angle of the toe in a bendable range of the toe from zero degree at which a contact area of the foot becomes maximum to a predetermined degree, the bending angle holder holding the toe at the bending angle comprising one from among the zero degree, the predetermined degree and an arbitrary angle between the zero degree and the predetermined angle, the bending angle at the time of liftoff can continue to be held after liftoff, whereby the robot can be prevented from becoming unstable owing to the toe contacting the floor immediately after liftoff. In addition, stability during tiptoe standing can be enhanced owing to the fact that the bending angle of the toe can be held (the toe can be locked) also during tiptoe standing.

Further, since the legged mobile robot recited in claim 2 is configured to further include a bending angle change suppressor that suppresses change of the bending angle of the toe, in addition to the effects mentioned above, occurrence of overshooting and vibration can be prevented when the toe is restored to the initial position.

Further, since the legged mobile robot recited in claim 3 is configured such that the toe is made continuous with the foot main body and is made of an elastic material that bends with flexing, in addition to the effects mentioned above, the structure of the foot can be made simple.

Further, since the legged mobile robot recited in claim 4 is configured such that the toe is connected to the fore end of the foot main body through a rotational shaft capable of rotating about a pitch axis, in addition to the effects mentioned above, the contact area during the tiptoe standing period can be maintained constant irrespective of how large or small the bending angle.

Further, since the legged mobile robot recited in claim 5 is configured to further include an urging means for urging the toe in a direction of restoring it to an initial position, in addition to the effects mentioned above, restoration of the toe to the initial position can be performed rapidly.

Further, since the legged mobile robot recited in claim 6 is configured such that the bending angle holder comprises a friction brake. it can obtain the same effects as those mentioned above.

Further, since the legged mobile robot recited in claim 7 is configured such that the bending angle change suppressor comprises a damper, it can obtain the same effects as those mentioned above.

Further, since the legged mobile robot recited in claim 8 is configured such that the bending angle holder and the bending angle change suppressor comprise a friction brake whose frictional force is made adjustable, in addition to the effects mentioned above, the structure of the foot can be simplified.

Further, since the legged mobile robot recited in claim 9 is configured such that the bending angle holder and the bending angle change suppressor comprise a damper, in addition to the effects mentioned above, the structure of the foot can be made simpler.

Further, since the legged mobile robot control system recited in claim 10 is configured to have a bending angle holder capable of holding a bending angle of the toe in a bendable range of the toe, and a bending angle controlling means for operating the bending angle holder to control holding and releasing of the bending angle of the toe, the bending angle controlling means holding the bending angle of the toe at a first time point which is a liftoff time of the leg from a floor or earlier thereof, and releasing the held bending angle of the toe at a second time point after the leg has lifted off the floor to restore the toe to a initial position, the bending angle at the time of liftoff can continue to be held after liftoff, whereby the robot can be prevented from becoming unstable owing to the toe contacting the floor immediately after liftoff. In addition, since the first time point is set to be earlier than the liftoff time of the leg, stability during tiptoe standing can be enhanced owing to the fact that the bending angle of the toe can be held (the toe can be locked) also during tiptoe standing.

Further, since the legged mobile robot control system recited in claim 11 is configured to further include a gait generating means for generating a gait of the robot, and the bending angle controlling means determines the first time point and the second time point based on the generated gait, in addition to the effects mentioned above, holding of the bending angle of the toe and releasing thereof can be made at appropriate time points.

Further, since the legged mobile robot control system recited in claim 12 is configured to further include a bending angle detecting means for detecting the bending angle of the toe, and a gait generating means for generating a gait of the robot, and the bending angle controlling means determines the first time point based on the detected bending angle and determines the second time point based on the generated gait, in addition to the effects mentioned above, holding of the bending angle of the toe and releasing thereof can be made at more appropriate time points.

Further, the legged mobile robot control system recited in claim 13 is configured such that the bending angle controlling means holds the bending angle of the toe at a third time point during liftoff of the leg from the floor, which is later than the second time point, and releasing the held bending angle of the toe at a fourth time point, after the leg has landed on the floor, which is earlier than the first time point at a next time, in addition to the effects mentioned above, sufficient contact area can be secured at the time of leg landing.

Further, since the legged mobile robot control system recited in claim 14 is configured to further include a gait generating means for generating a gait of the robot, and the bending angle controlling means determines the first to fourth time points based on the generated gait, in addition to the effects mentioned above, holding of the bending angle of the toe and releasing thereof can be made at appropriate time points.

Further, since the legged mobile robot control system recited in claim 15 is configured to further include a bending angle detecting means for detecting the bending angle of the toe, and a gait generating means for generating a gait of the robot and the bending angle controlling means determines the first and third time points based on the detected bending angle, and determines the second and fourth time points based on the generated gait, in addition to the effects mentioned above, holding of the bending angle of the toe and releasing thereof can be made at more appropriate time points.

Further, since the legged mobile robot control system recited in claim 16 is configured to further include a bending angle change suppressor that suppresses change of the bending angle of the toe; and the bending angle controlling means releases the held bending angle of the toe at the second time point to gradually restore the toe to the initial position by operating the bending angle change suppressor to reduce the bending angle progressively, in addition to the effects mentioned above, occurrence of overshooting and vibration can be prevented when the toe is restored to the initial position.

Further, since the legged mobile robot control system recited in claim 17 is configured to further include a bending angle change suppressor that suppresses change of the bending angle of the toe, and the bending angle controlling means operates the bending angle change suppressor from the fourth time point to the first time point at the next time to control a floor reaction force acting to the robot through the foot, in addition to the effects mentioned above, stability during tiptoe standing can be enhanced.

Further, since the legged mobile robot control system recited in claim 18 is configured to further include a bending angle change suppressor that suppresses change of the bending angle of the toe in accordance with a predetermined resistance characteristic set with respect to angular velocity of the bending angle; and the bending angle controlling means manipulates a position or posture of the foot from the fourth time point to the first time point at the next time to regulate the bending angular velocity of the toe, thereby varying magnitude of resistance produced by the bending angle change suppressor to control a floor reaction force acting to the robot through the foot, in addition to the effects mentioned above, stability during tiptoe standing can be enhanced.

Further, the legged mobile robot control system recited in claim 19 is configured to further include a bending angle change suppressor that suppresses change of the bending angle of the toe; a bending angle detecting means for detecting the bending angle of the toe, and a floor shape estimating means for estimating shape of the floor on which the foot is based on at least the detected bending angle, and the bending angle controlling means operates the bending angle change suppressor from the fourth time point to the first time point at the next time based on at least the estimated shape of the floor to control a floor reaction force acting to the robot through the foot, in addition to the effects mentioned above, stability during tiptoe standing can be enhanced.

BRIEF DESCRIPTION OF THE DRAWINGS

FIG. 37 is a block diagram showing the calculation processing of a foot compensating angle determiner of a legged mobile robot control system according to a ninth embodiment.

BEST MODES FOR CARRYING OUT THE INVENTION

The best modes for implementing the legged mobile robot and control system thereof according to this invention will be explained with reference to the attached drawings in the following.

FIRST EMBODIMENT

Figure 1:
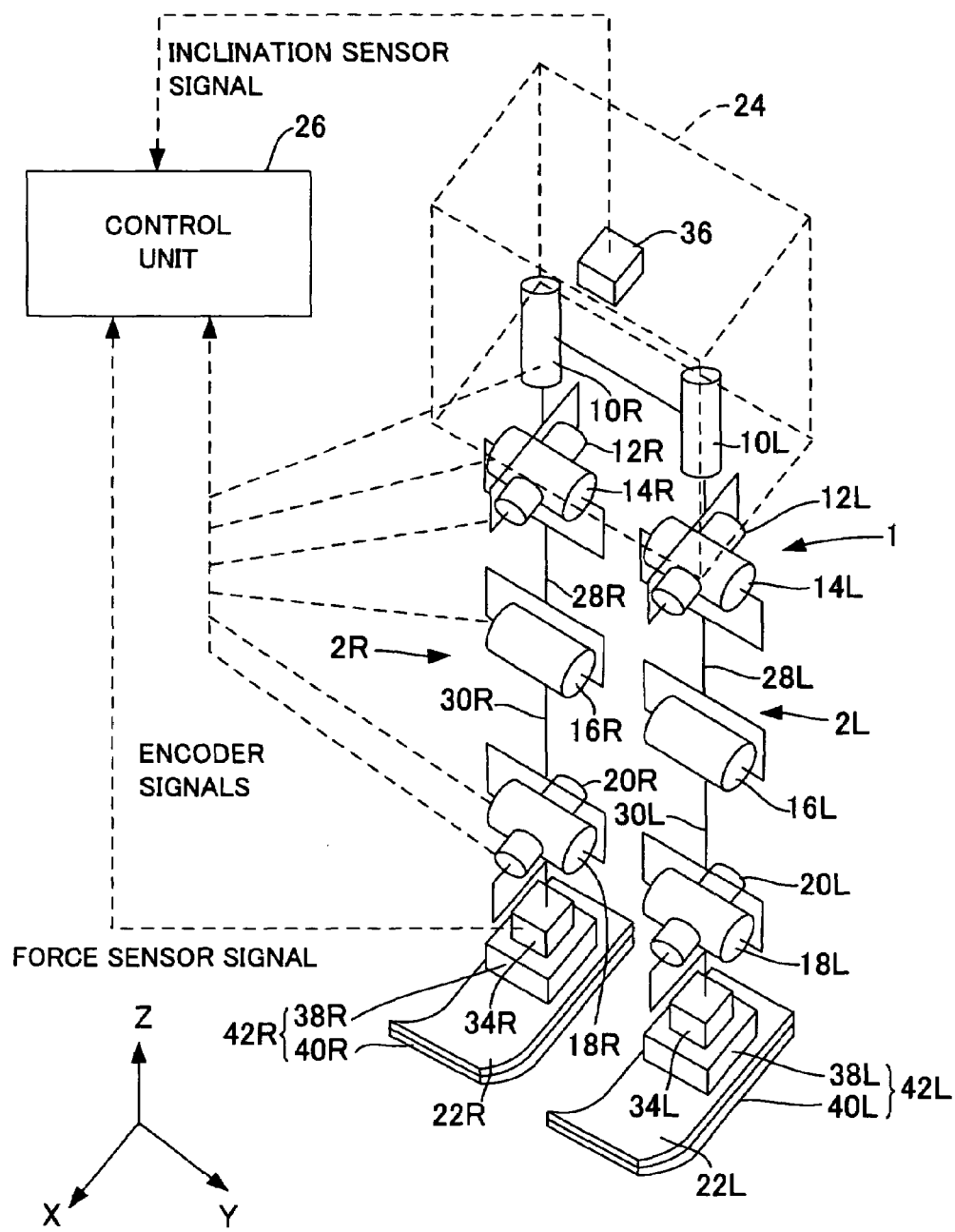
FIG. 1 is a schematic drawing showing a legged mobile robot according to a first embodiment of the invention.

FIG. 1 is a schematic drawing showing a legged mobile robot according to this embodiment.

As illustrated, a legged mobile robot 1 (hereinafter called "robot") is a biped walking robot equipped with left and right legs (leg links) 2R, 2L (where R means right side and L means left side as viewed in the direction of forward movement; hereinafter the same) The right and left legs 2R(L) are respectively provided with six rotational shafts (degrees of freedom). The six rotational shafts comprise, starting from the top, rotational shafts 10R, 10L of hips (crotch) for leg swiveling (about Z-axes), rotational shafts 12R, 12L about hip roll axes (about X axes), rotational shafts 14R, 14L about hip pitch axes (about Y axes), rotational shafts 16R, 16L about knee pitch axes, rotational shafts 18R, 18L about ankle pitch axes, and rotational shafts 20R, 20L about ankle roll axes.

Feet 22R, 22L are attached to the lower ends the legs 2R(L). Further, a body 24 is attached to the upper ends of the legs 2R(L). A control unit 26, comprising a microcomputer, and so forth are housed in the body 24. In the foregoing, the hip joints (or waist joints) comprise the rotational shafts 10R(L), 12R(L), 14R(L), the knee joints comprise the rotational shafts 16R(L), and the ankle joints comprise rotational shafts 18R(L), 20R(L). Further, the hip joints and knee joints are connected by thigh links 28R, 28L and the knee joints and ankle joints by shank links 30R, 30L.

Thus the legs 2R(L) of the robot 1 are given 6×2=12 axes of rotation. And the legs as a whole can be imparted with desired movements by driving the rotational shafts to appropriate angles with electric motors (not shown), so the robot 1 can be made to walk as desired. Although arms and a head are provided on the body 24, illustration and explanation thereof are omitted because they are not directly related to the characteristics of the invention.

Conventional six-axis force sensors 34R, 34L are attached below the ankle joints to measure force components Fx, Fy and Fz of three directions and moment components Mx, My and Mz of three directions, and detect, inter alia, whether or not the feet 22R(L) are in contact with the ground and the floor reaction force (landing load) acting on the robot 1 through the feet 22R(L). In addition, an inclination sensor 36 is installed on the body 24 and detects inclination relative to the Z axis (vertical direction (gravitational direction)) and the angular velocity thereof. Each of the electric motors for driving the rotational shafts has a rotary encoder installed adjacent thereto for detecting its amount of rotation.

Further, spring mechanism units 38R, 38L are installed between the ground contact ends of the feet 22R(L) and the six-axis force sensors 34R(L), and soles 40R, 40L that are elastic bodies (specifically, bodies made of rubber) are attached to the soles of the feet to constitute compliance mechanisms 42R, 42L.

FIGS. 2 to 5 are enlarged sectional views of one foot 22. Since the left and right feet 22R(L) are laterally symmetrical, affixation of R, L will be omitted in the explanation of FIG. 2 and later figures.

Figure 2:
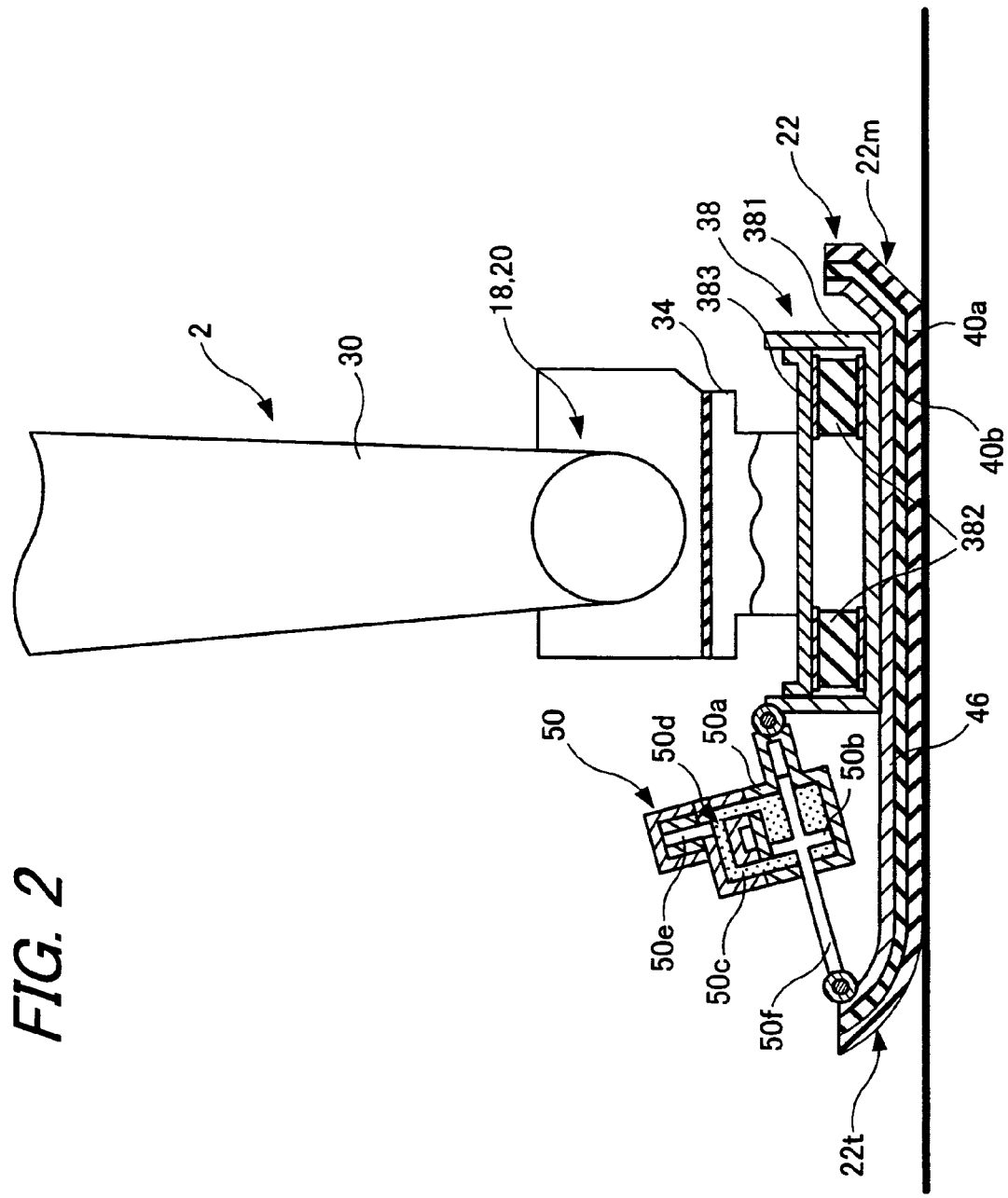
FIG. 2 is an enlarged sectional view of one foot of the legged mobile robot shown in FIG. 1.

As shown in FIG. 2, the sole 40 is composed of two vertically stacked and disposed rubber members (sole in contact with floor designated by symbol 40a; sole disposed thereabove designated by symbol 40b), and a foot plate 46 is disposed thereabove. The foot plate 46 is formed of an elastically deformable metal material. That is, the sole of the foot 22 is constituted to be elastically deformable.

The aforesaid spring mechanism unit 38 is installed above the foot plate 46. The spring mechanism unit 38 comprises a spring mechanism unit frame 381 formed of a high-rigidity metal material, multiple rubber bushes (elastic bodies) 382 accommodated within a space defined by the spring mechanism unit frame 381, and a spring mechanism unit plate 383 attached to the upper surfaces of the rubber bushes 382.

Like the spring mechanism unit frame 381, the spring mechanism unit plate 383 is formed of a high-rigidity metal material. Further, the six-axis force sensor 34 is attached to the top of the spring mechanism unit plate 383 and the shank link 30 of the leg 2 is attached to the top of the six-axis force sensor 34 through the ankle joint 18, 20.

When the robot 1 receives floor reaction force, the spring mechanism unit 38 and the soles 40a, 40b in the compliance mechanism 42 flex to change the position/posture of the foot 22. This mechanism is not only for cushioning impact at floor contact but is also important for enhancing control performance. Note that explanation of the details thereof is omitted here because they are set out in the applicant's earlier proposed Japanese Laid-open Patent Application No. Hei 5-305584.

Further, the foot 22 is provided with a damper 50. The damper 50 comprises a cylinder 50a in which a fluid (hydraulic fluid, for example) is sealed, a piston 50b disposed to be slidable inside the cylinder 50a, a communication passage 50c communicating spaces in the cylinder 50a that face each other across the piston 50b, an orifice 50d formed midway of the communication passage 50c, an electromagnetic solenoid 50e for regulating the opening area of the orifice 50d to one or the other of zero and a predetermined value (other than zero) (i.e., to close or open the orifice 50d), and a piston rod 50f connected to the piston 50b. That is, the damper 50 utilizes the flow resistance of the fluid passing through the orifice 50d. Note that FIG. 2 shows the state of the opening area of the orifice 50d regulated to the predetermined value. Further, the electromagnetic solenoid 50e regulates the opening area of the orifice 50d to the predetermined value when energized and regulates it to zero when de-energized.

One end (cylinder bottom) of the damper 50 is connected to the fore end (fore end viewed in the direction of forward movement) of the spring mechanism unit frame 381 to be rotatable about a pitch axis. On the other hand, the other end (rod head) of the damper 50 is connected to the fore end of the foot plate 46 to be rotatable about a pitch axis.

Figure 3:
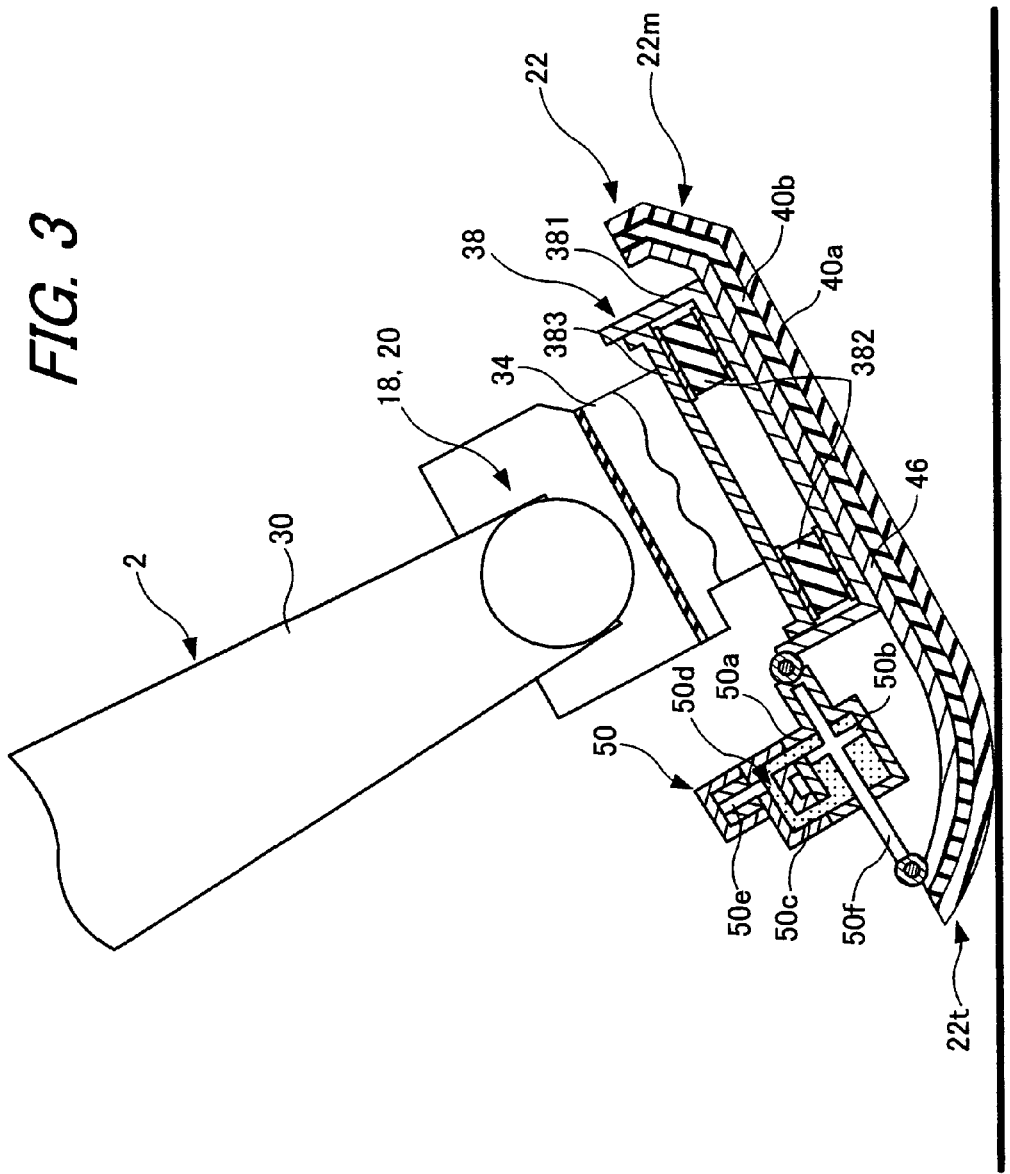
FIG. 3 is an enlarged sectional view similarly showing the one foot of the legged mobile robot.

Here, as shown in FIG. 3, when the heel of the foot 22 lifts off the floor with the opening area of the orifice 50d regulated to the predetermined value (i.e., with the piston 50b movable inside the cylinder 50a and the damper 50 capable of extension/contraction), the region of the elastically deformable foot 22 forward of the region where the spring mechanism unit frame 381 made of high-rigidity material is attached flexes and bends. Hereinafter, this region in the foot 22 that bends is called the "toe" and is designated by symbol 22t. Further, the remaining region other than the toe 22t in the foot 22 is called the "foot main body" and designated by symbol 22m.

Thus the foot 22 comprises the foot main body 22m connected to the leg 2 through the spring mechanism unit 38 and so forth, and the toe 22t provided at the fore end thereof. Further, the toe 22t is made of an elastic body continuous with the foot main body 22m and is bendable with respect to the foot main body 22m.

Figure 4:
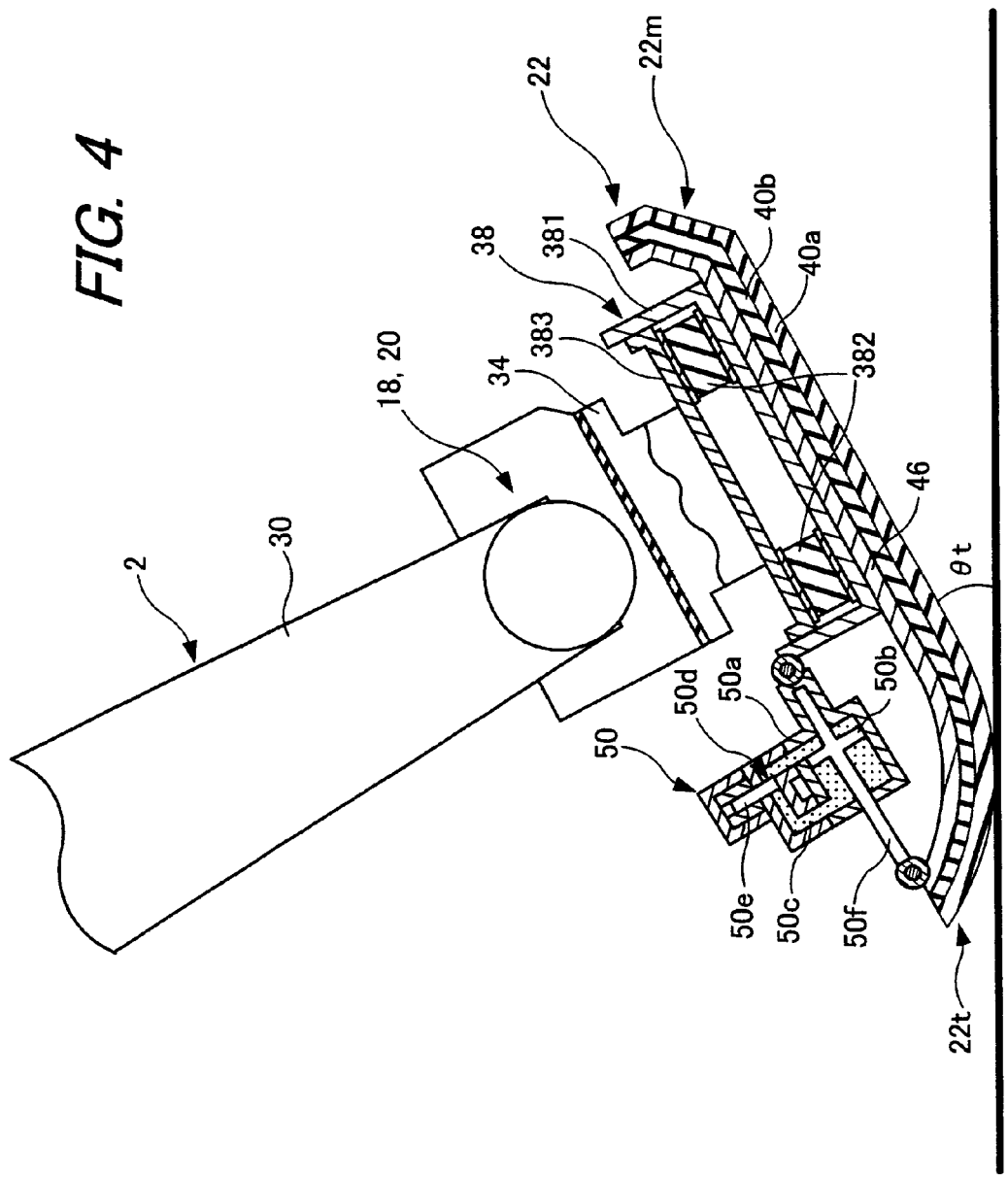
FIG. 4 is an enlarged sectional view similarly showing the one foot of the legged mobile robot.
Figure 5:
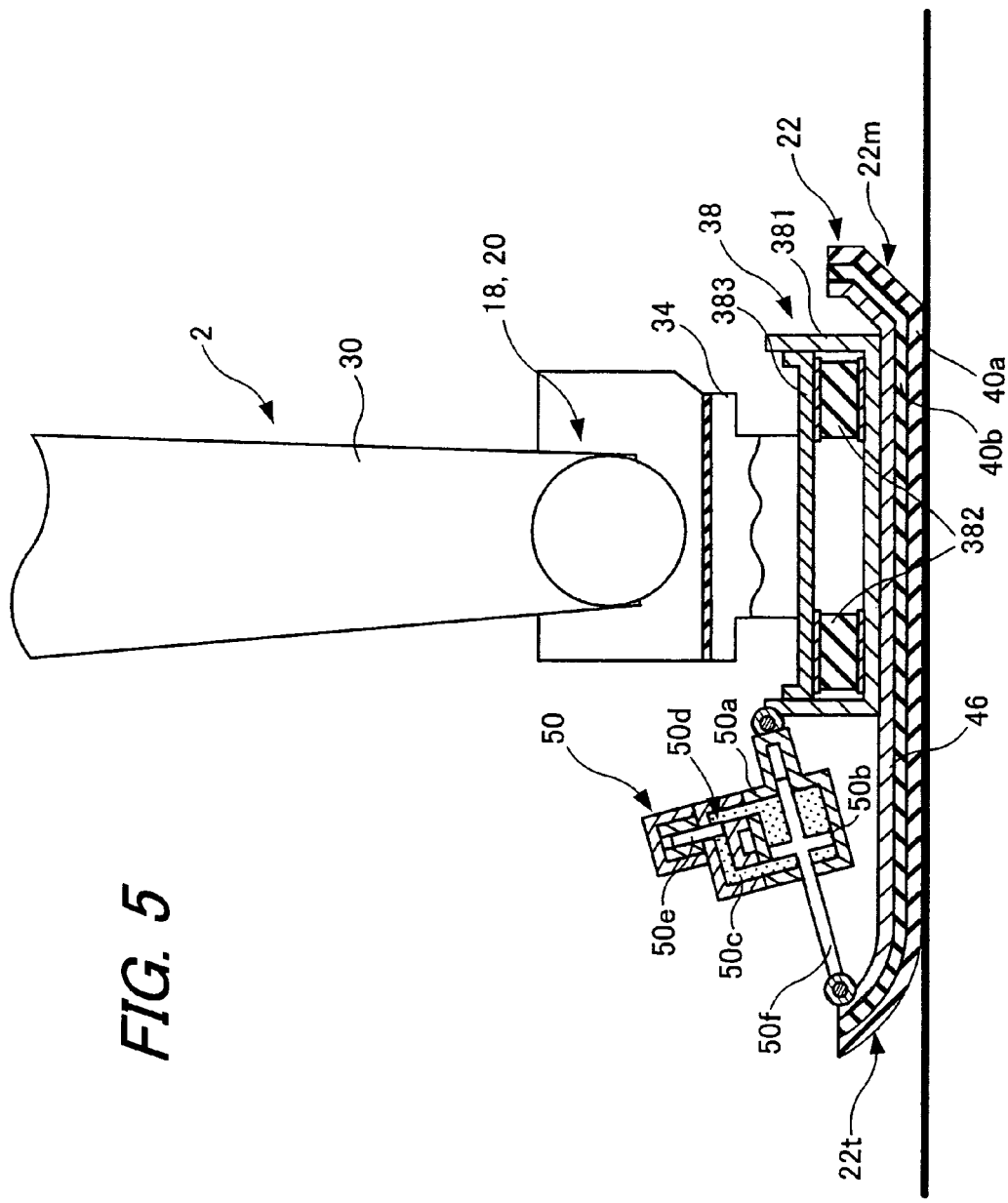
FIG. 5 is an enlarged sectional view similarly showing the one foot of the legged mobile robot.

On the other hand, as shown in FIG. 4, when the opening area of the orifice 50d is regulated to zero with the toe 22t bent, movement of the piston 50b (extension/contraction of the damper 50) becomes impossible and the bending angle of the toe 22t at that time (designated by θt in FIG. 4) is held or maintained. Further, when the robot 1 is not in the state of tiptoe standing, if the opening area of the orifice 50d is returned to the predetermined value to make the piston 50b movable, the restoring force of the sole 40a, 40b and foot plate 46 restores the toe 22t to its initial position (position of zero bending angle). In addition, as shown in FIG. 5, when the toe 22t is not bent, the toe 22t can be held or maintained at the initial position by regulating the opening area of the orifice 50d to zero.

That is, one end of the damper 50 is connected to the foot main body 22m side, the other end is connected to the toe 22t side, and extension/contraction thereof is disabled by adjusting the aperture thereof. Specifically, the electromagnetic solenoid 50e provided in the damper 50 is operated to regulate the opening area of the orifice 50d to zero to hold the bending angle of the toe 22t at the angle at that time. In other words, the damper 50 is provided between the foot main body 22m and toe 22t and configured to make the opening area of the orifice 50d adjustable between zero and the predetermined value, whereby the bending angle of the toe 22t can be held or maintained anywhere in the movable range of the toe 22t. In other words, it is made possible to hold or maintain the bending angle of the toe 22t at an arbitrary angle in the movable range of the toe 22t (in still other words, anywhere in the continuum of angles within the movable range).

Further, the damper 50 utilizes the flow resistance of the fluid passing through the aforesaid orifice 50d. Therefore, increase/decrease of the bending angle is resisted to suppress change thereof even when the bending angle of the toe 22t is not held.

That is, the damper 50 functions as a mechanism capable of holding the bending angle of the toe 22t in the movable range thereof (hereinafter called the "bending angle holder") and simultaneously also functions as a mechanism for suppressing the bending angle change (hereinafter called the "bending angle change suppressor").

Thus the foot 22 comprises the foot main body 22m connected to the leg 2 and the toe 22t provided on the fore end of the foot main body 22m to be bendable with respect to the foot main body 22m and is equipped with the damper 50 as the bending angle holder capable of holding the bending angle of the toe 22t in the movable range thereof and as the bending angle change suppressor for suppressing bending angle change.

Figure 6:
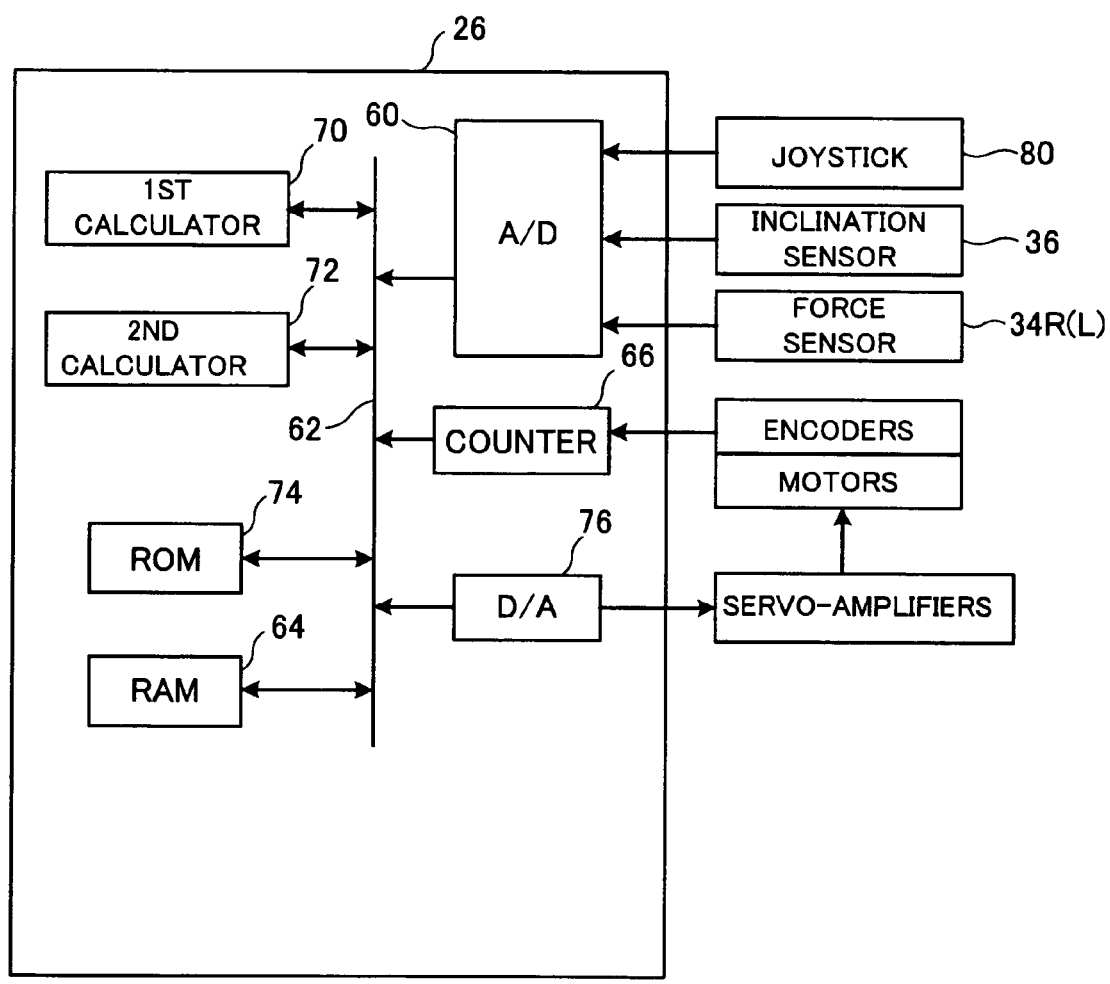
FIG. 6 is a block diagram showing the details of a control unit shown in FIG. 1 of the legged mobile robot.

FIG. 6 is a block diagram showing the details of a control unit 26. In the control unit 26, the outputs of the six-axis force sensors 34R(L), inclination sensor 36 and the like are converted to digital values by an A/D converter 60 and then inputted to a RAM 64 through a bus 62. Further, the outputs of the encoders installed adjacent to the electric motors are inputted to the RAM 64 through a counter 66.

First and second calculators 70, 72 constituted as CPUs are provided inside the control unit 26 and, as discussed later, the first calculator 70 calculates displacement commands for the rotational shafts and toes based on a gait stored in a ROM 74 and sends them to the RAM 64. Further, the second calculator 72 reads the commands and detected measured values from the RAM 64, calculates control values required to regulate driving of the rotational shafts and bending angle of the toes, and outputs them through a D/A converter 76 and a servo amplifier to the electric motors that drive the joints. In addition, a joystick 80 is connected to the control unit 26 by wire or wirelessly to establish a configuration that enables requests regarding gait, such as straight forward or turning movement, to be inputted to the robot 1 from the exterior.

Next, an explanation will be made regarding the control system of the legged mobile robot according to this embodiment. The control system according to this embodiment is, in overview, what is obtained by adding control related to the aforesaid bendable toes to the technique set out in the applicant's earlier proposed Japanese Laid-open Patent Application No. Hei 10-277969 (technique of manipulating foot postural inclination for appropriately controlling floor reaction force acting on robot; hereinafter called "composite-compliance control").

Note that the meanings of the terms used in the following explanation are in accordance with the definitions in said Japanese Laid-open Patent Application No. Hei 10-277969 (and the references cited therein). In the ensuing description, explanation regarding structural features other than characteristic features of this application are limited to a general summary of their operations, and they are concretely implemented in accordance with the conditions, equations and the like set out in detail in the previously proposed aforesaid references.

Figure 7:
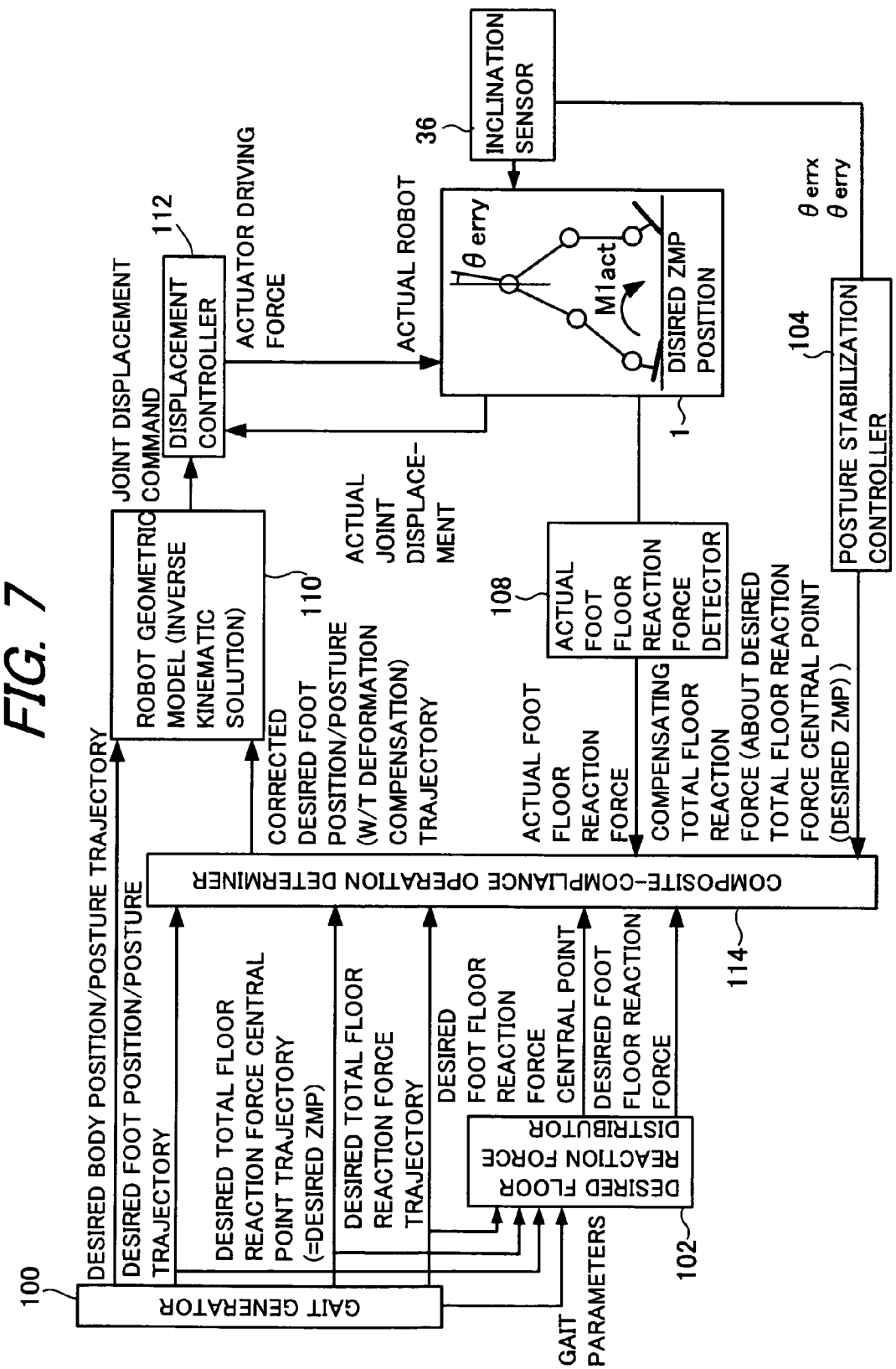
FIG. 7 is a block diagram functionally showing the configuration and operation of a legged mobile robot control system shown in FIG. 1.

FIG. 7 is a block diagram functionally showing the configuration and operation of the legged mobile robot control system according to this embodiment.

As shown in FIG. 7, the control system is equipped with a gait generator 100 and the gait generator 100 generates and outputs a desired gait. The desired gait comprises a desired motion pattern and a desired floor reaction force pattern, more specifically, a desired body position/posture trajectory, a desired foot position/posture trajectory, a desired total floor reaction force central point (desired ZMP) trajectory, and a desired total floor reaction force trajectory (or pattern).

The desired total floor reaction force outputted by the gait generator 100 is the total floor reaction force dynamically equilibrate with the desired motion pattern.

Therefore, the desired total floor reaction force central point is made equal to the desired ZMP.

A desired floor reaction force distributor 102 inputs the aforesaid desired total floor reaction force central point (desired ZMP) and desired foot position/posture as its main input and determines and outputs a desired foot floor reaction force central point. Actually, the gait parameters from the gait generator 100 (e.g., two-leg support stage time period, desired free leg landing position and the like), the gait stage/time period (e.g., the fact that the current time is 0.1 [sec] after the beginning of the two-leg support period and the like), and other such information are fetched as necessary.

Further, the desired floor reaction force distributor 102 also determines and outputs desired foot floor reaction force. The desired foot floor reaction force is necessary for flex compensation of the compliance mechanism 42.

A posture stabilization controller 104 estimates the state of the robot 1 based on the sensor information and calculates a compensating total floor reaction force's moment.

Further, an actual foot floor reaction force detector 108 detects the actual foot floor reaction force (the resultant of which is the actual total reaction force) in accordance with the outputs of the six-axis force sensors 34. In addition, the relative position/posture of each foot 22R(L) with respect to a coordinate system fixed on the body 24 is calculated based on the actual displacements detected by the joint encoders (and/or displacement commands), the detection values of the six-axis force sensors 34 are coordinate-transformed thereby and the actual foot floor reaction force expressed in the coordinate system fixed on the body are calculated, whereafter they are converted to the supporting leg coordinate system.

Upon being inputted with the body position/posture and foot position/posture, a robot geometric model (inverse kinematic solution) 110 calculates joint displacements that satisfy them. Here, the inverse kinematic solution equation is directly determined and the joint displacements are obtained simply by substituting the body position/posture and foot position/posture into the equation. That is, the robot geometric model 110 is inputted with the desired body position/posture and the corrected desired foot position/posture trajectory (corrected desired foot position/posture trajectory with deformation compensation) corrected in a composite-compliance operation determiner 114 discussed below, and displacement commands (values) for the 12 rotational shafts (10R(L) etc.) are calculated therefrom.

A displacement controller 112 (same as the aforesaid second calculator 72) controls the displacement of the 12 rotational shafts of the robot 1 to follow as desired values the joint displacement commands (values) calculated by the robot geometric model (inverse kinematic solution) 110.

The composite-compliance operation determiner 114 corrects the desired foot position/posture trajectory so as to make the resultant of the desired total floor reaction force and the compensating total floor reaction force agree with the actual total floor reaction force. Note that the aforesaid "total floor reaction force" and "foot floor reaction force" are concretely expressed by the point of action and the force and moment of force acting thereat, and in the actual computation the force component and moment component are used as set out below.

Based on the foregoing, the operation of the system will be explained with reference to the FIG. 8 flowchart (structured flowchart). Note that on the left side of the drawing are shown the corresponding processing operations performed by the constituent elements of the FIG. 7 block diagram.

First, in S10, the system is initialized and the program proceeds through S12 to S14, wherein it waits for timer interrupt. A timer interrupt is done every 50 [msec]. That is, the control cycle of this system is 50 [msec].

The program next proceeds to S16, in which it is determined whether the gait is at a point of switching, specifically whether it is at a point of switching the supporting leg, and when the result is NO, proceeds to S22, and when YES, proceeds to S18, in which a timer t is initialized, and to S20, in which desired gait parameters are set. As explained above, the gait parameters comprise motion parameters and floor reaction force parameters (ZMP trajectory parameters).

The program then proceeds to S22, in which the instantaneous values of the desired gait are determined. Here, "instantaneous values" means the values at every control cycle, and the desired gait instantaneous values comprise the desired body position/posture, desired foot position/posture and desired ZMP position. Note "posture" here means "orientation" in X, Y, Z space.

The program then proceeds to S24, in which the desired foot floor reaction force central point is determined, and further proceeds to S26, in which the desired foot floor reaction force is determined.

The program then proceeds to S28, in which the inclination of the body 24 and other conditions of the robot 1 are detected from the outputs of the aforesaid inclination sensor 36 and the like.

The program then proceeds to S30, in which compensating total floor reaction force moments (about the desired total floor reaction force central point (desired ZMP)) Mdmdx, Mdmdy for posture stabilization through the states of the robot 1 and some similar factors are determined.

The program then proceeds to S32, in which the actual foot floor reaction force is detected. As explained above, this is detected from the output of the six-axis force sensor 34.

The program then proceeds to S34, in which a feet compensating angle $\theta dbv$ and a foot compensating angle $\theta nx(y)$ are determined. These are tasks conducted by the composite-compliance operation determiner 114.

Note that in this specification "n" indicates a leg serial number (n: 1 or 2), where the leg remaining in contact with the floor for a certain gait period is represented as "1" and the other leg as "2."

Figure 9:
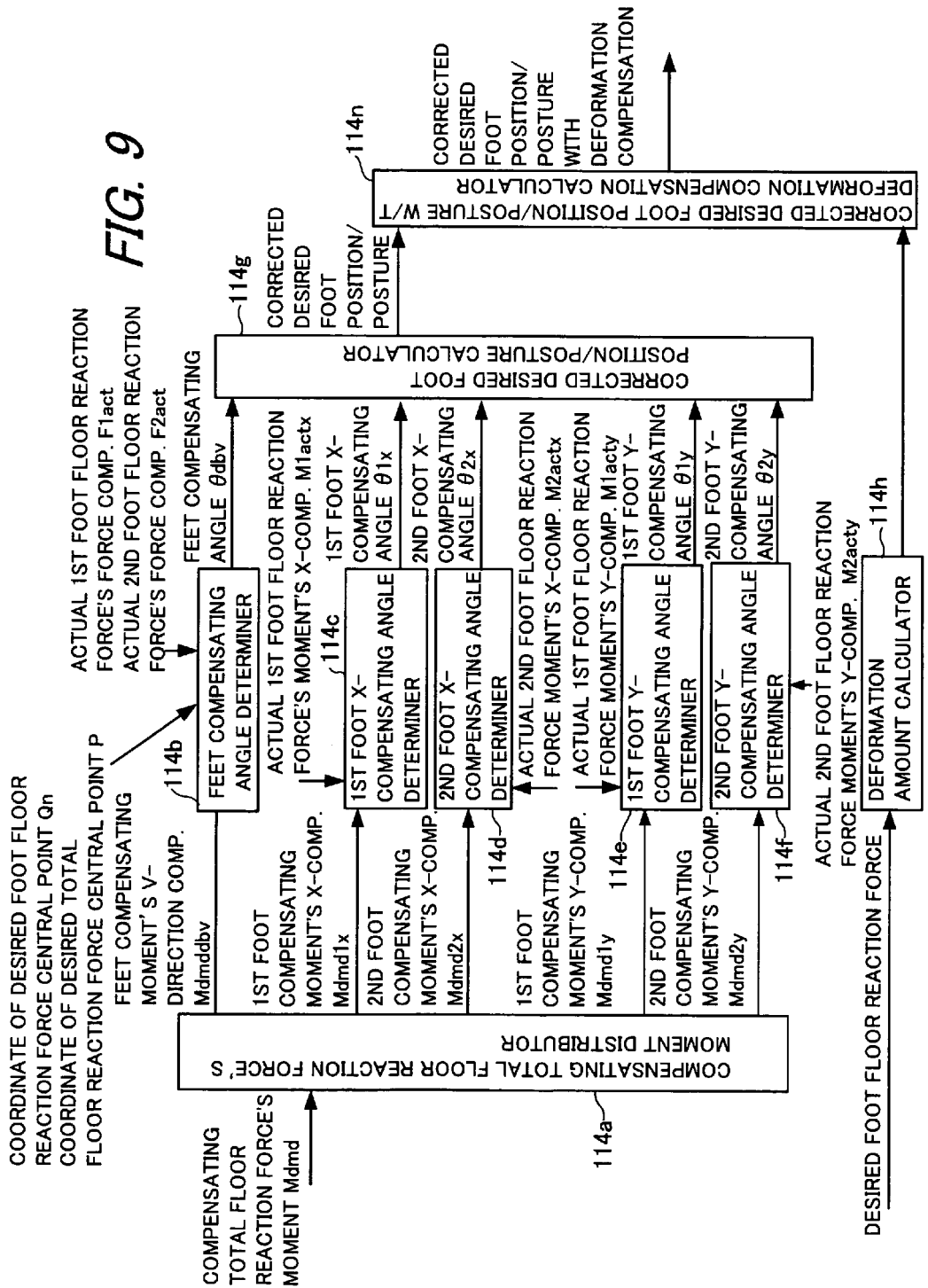
FIG. 9 is a block diagram indicating the calculation processing of a composite-compliance operation determiner shown in FIG. 7.

FIG. 9 is a block diagram indicating the processing of the composite-compliance operation determiner 114; the processing will be explained with reference to this diagram.

A compensating total floor reaction force's moment distributor 114a divides the compensating total floor reaction force's moment Mdmd into a feet compensating moment Mdmddb and foot compensating moments Mdmd1x, Mdmd1y, Mdmd2x, Mdmd2y. The feet compensating moment Mdmddb (whose component about the V direction is denoted Mdmddbv) is the desired value of the moment produced by a force component of the foot floor reaction force about the desired total floor reaction force central point (desired ZMP) to be obtained by manipulating the feet compensating angle (foot vertical amount) θdbv. Note that "V" in the foregoing is the normal vector to a plane perpendicular to horizontal including the desired foot floor reaction force central point and has a magnitude of 1.

Figure 10:
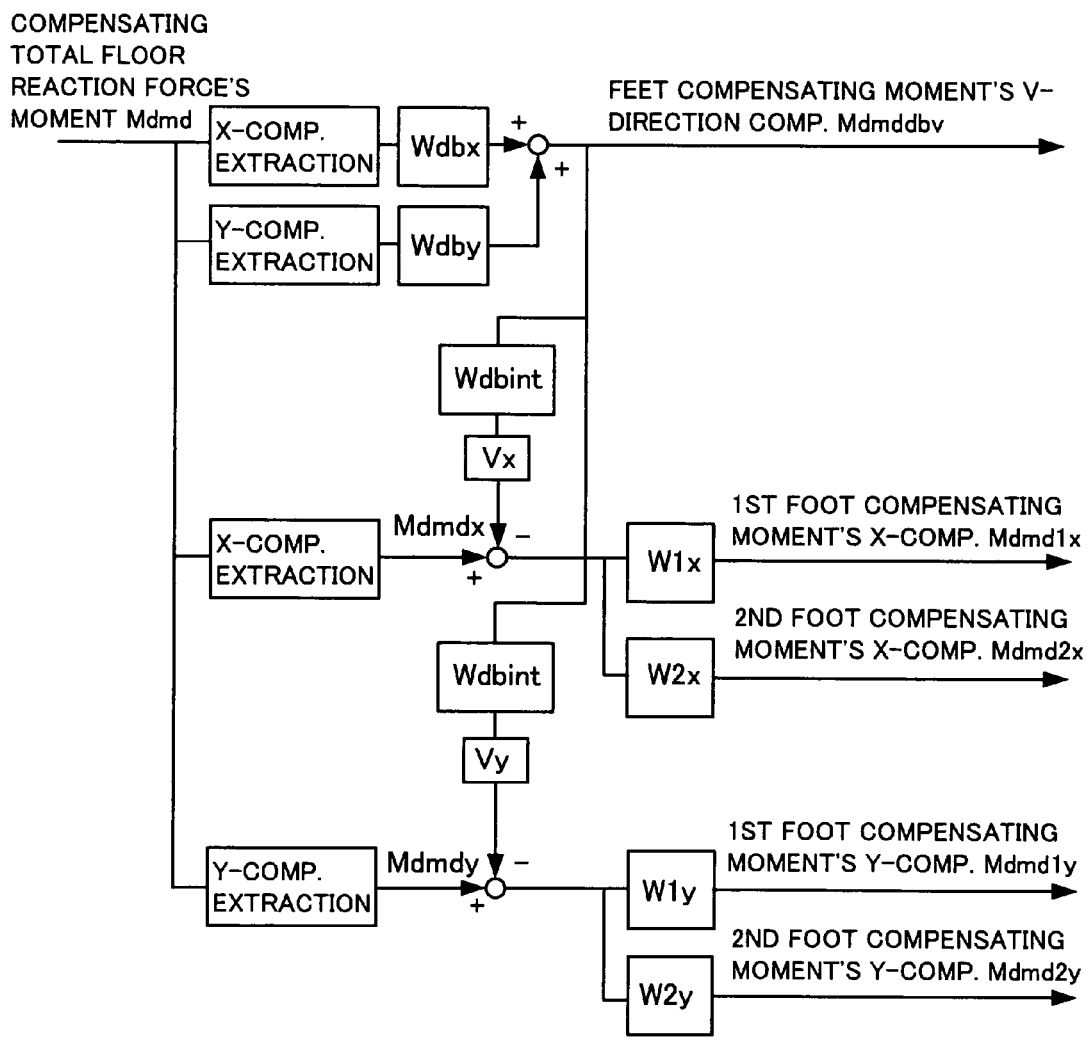
FIG. 10 is a block diagram indicating the calculation processing of a compensating total floor reaction force's moment distributor shown in FIG. 9.

Specifically, the distribution is conducted in accordance with the block diagram shown in FIG. 10. In FIG. 10, Wdbx, Wdby, W1x, W1y, W2x, W2y and Wdbint are weighting parameters for distribution. Vx is the value of the X-component of vector V and Vy is the value of the Y-component of vector V Wdbint among them is for canceling the total floor reaction force's moment generated by manipulation of the feet compensating angle, by manipulating the foot compensating angle.

Returning to the explanation of FIG. 9, next, taking the actual foot floor reaction force and distributed compensating total floor reaction force's moment and the like into account, the aforesaid compensating angles θdbv and θnx(y) are determined in a feet compensating angle determiner 114b and nth foot X(Y) compensating angle determiners 114c, 114d, 114e, 114f.

Figure 11:
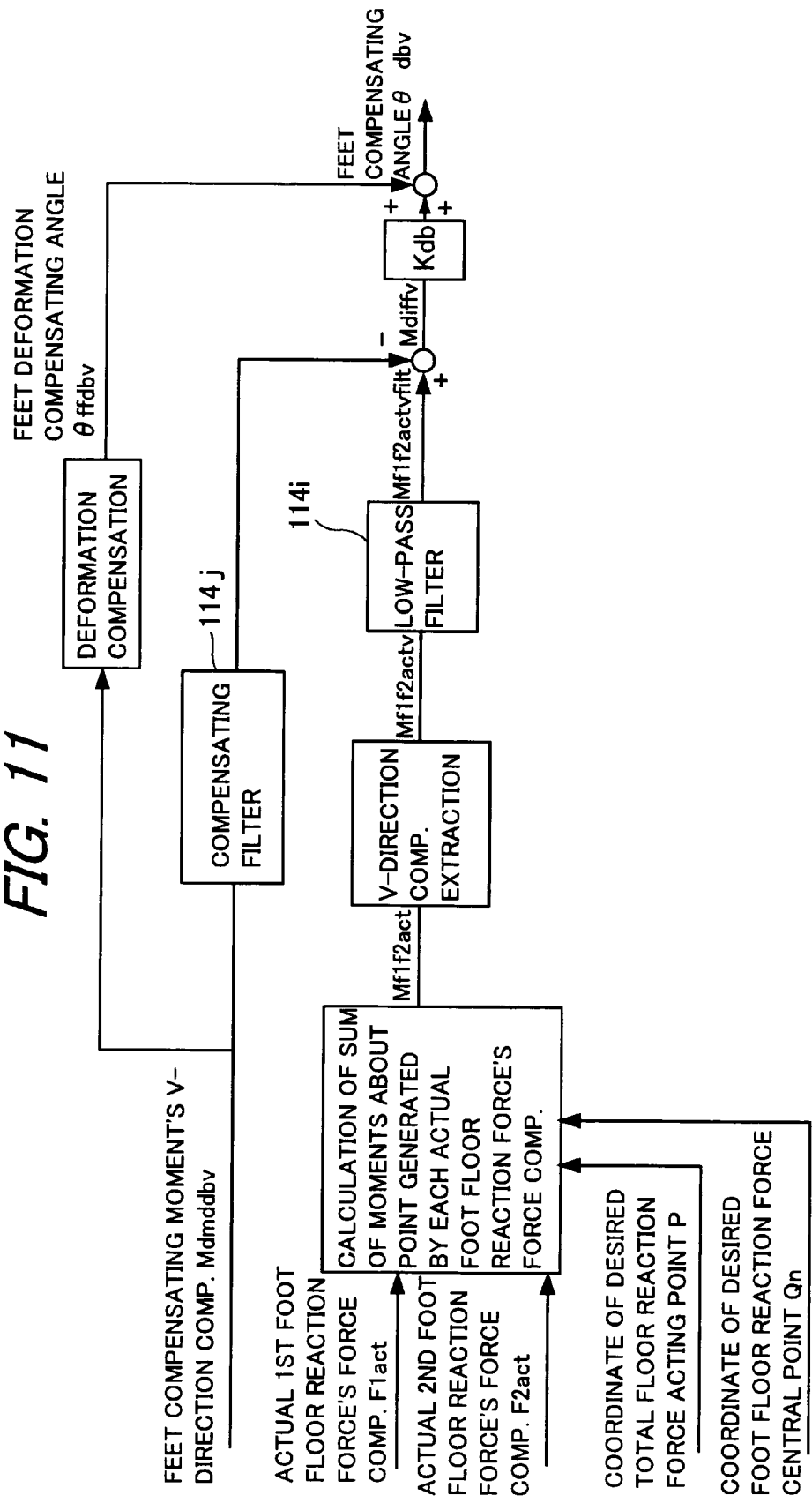
FIG. 11 is a block diagram showing the calculation processing of a feet compensating angle determiner shown in FIG. 9.

FIG. 11 is a block diagram of the processing of the feet compensating angle determiner 114b and the feet compensating angle θdbv is calculated as illustrated.

Explaining with reference to FIG. 11, the moment Mf1f2act generated about a desired total floor reaction force central point P is determined based on the force component F1act of the actual floor reaction force acting at a desired first foot floor reaction force center point Q1 and the force component F2act of the actual floor reaction force acting at a desired second foot floor reaction force center point Q2.

Next, the V vector-direction component Mf1f2actv of Mf1f2act is extracted. Next, Mf1f2actv is passed through a low-pass filter 114i to obtain Mf1f2actvfilt.

Next, the feet compensating moment's vector V-direction component Mdmddbv is passed through a compensating filter 114j to subtract it from Mf1f2actvfilt and obtain a deviational moment V-direction component Mdiffv.

Note that the compensating filter 114j is for enhancing the frequency response characteristic of the transfer function from the feet compensating moment's V-direction component Mdmddbv to the actual total floor reaction force's moment.

Next, a feet deformation compensating angle θffdbv for canceling the effect of the deformation of the compliance mechanism 42 on the feet compensating moment's vector V-direction component Mdmddbv is determined. This is so-called feed-forward compensation.

Finally, the feet deformation compensating angle θffdbv is added to the product of the deviational moment V-direction component Mdiffv and the control gain Kdb to obtain the feet compensating angle θdbv.

Figure 12:
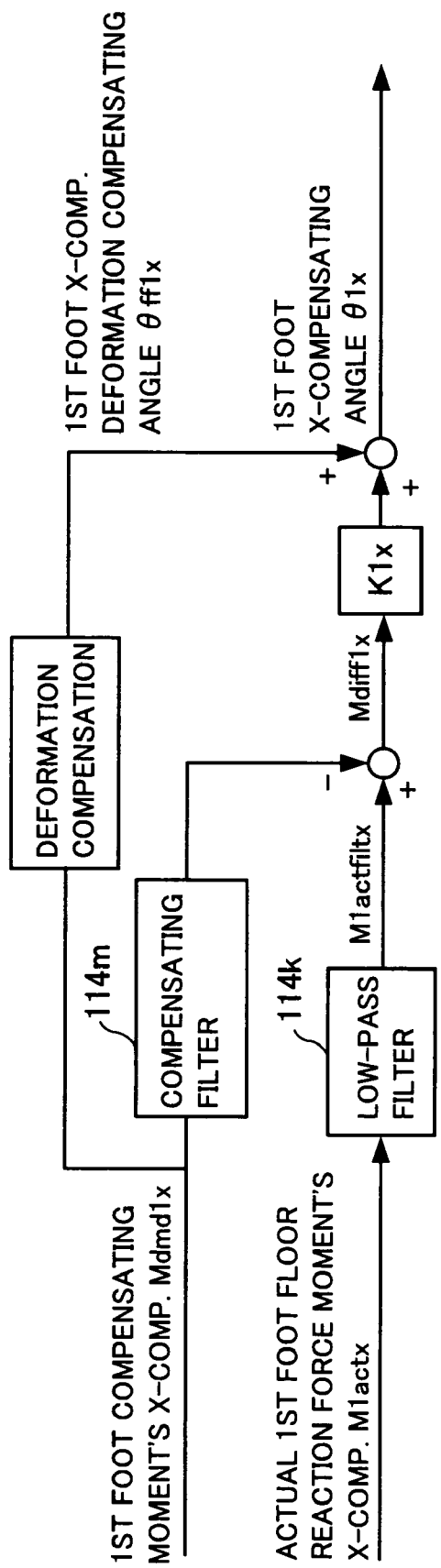
FIG. 12 is a block diagram showing the calculation processing of a foot compensating angle determiner shown in FIG. 9.

Next, the nth foot compensating angle determiners will be explained. FIG. 12 is a block diagram showing the processing of the 1st foot X-compensating angle determiner 114c thereamong. The 1st foot X-compensating angle determiner 114c calculates a 1st foot X-compensating angle θ1x in the illustrated manner. Although explanation will be omitted, a 1st foot Y-compensating angle θ2y, 2nd foot X-compensating angle θ2x, and 2nd foot Y-compensating angle θ2y are similarly determined. Only the algorithm for determining the 1st foot X-compensating angle θ1x will be explained here.

The actual 1st foot floor reaction force's moment's X-component M1actx is passed through a low-pass filter 114k to obtain M1acffiltx. The 1st foot compensating moment's X-component Mdmd1x is passed through a compensating filter 114m to subtract it from M1actfiltx and obtain the deviational moment Mdiff1x. Similarly to in the feet compensating angle determination, the compensating filter 114m is for enhancing the frequency response characteristic of the transfer function from Mdmd1x to the actual total floor reaction force.

Next, similarly to in the feet compensating angle determination, a 1st foot X-component deformation compensating angle θff1x for canceling the effect of the deformation of the compliance mechanism 42 on the 1st foot compensating moment's X-component is determined. This is so-called feed-forward compensation.

Finally, the 1st foot X-component deformation compensating angle θff1x is added to the product of the deviational moment Mdiff1x and the control gain K1x to obtain the 1st foot X-compensating angle θ1x.

Returning to the explanation of FIG. 9, next, a corrected desired foot position/posture calculator 114g corrects the desired foot position/posture based on the feet compensating angle θdbv, 1st foot X-compensating angle θ1x, 1st foot Y-compensating angle θ1y, 2nd foot X-compensating angle θ2x and 2nd foot Y-compensating angle θ2y, thereby obtaining a corrected desired foot position/posture.

A deformation amount calculator 114h determines the amount of deformation of the compliance mechanism 42 that would be produced by the desired foot floor reaction force.

A corrected desired foot position/posture with deformation compensation calculator 114n further corrects the corrected desired foot position/posture so as to cancel the calculated deformation amount, thereby obtaining a corrected desired foot position/posture with deformation compensation.

Figure 8:
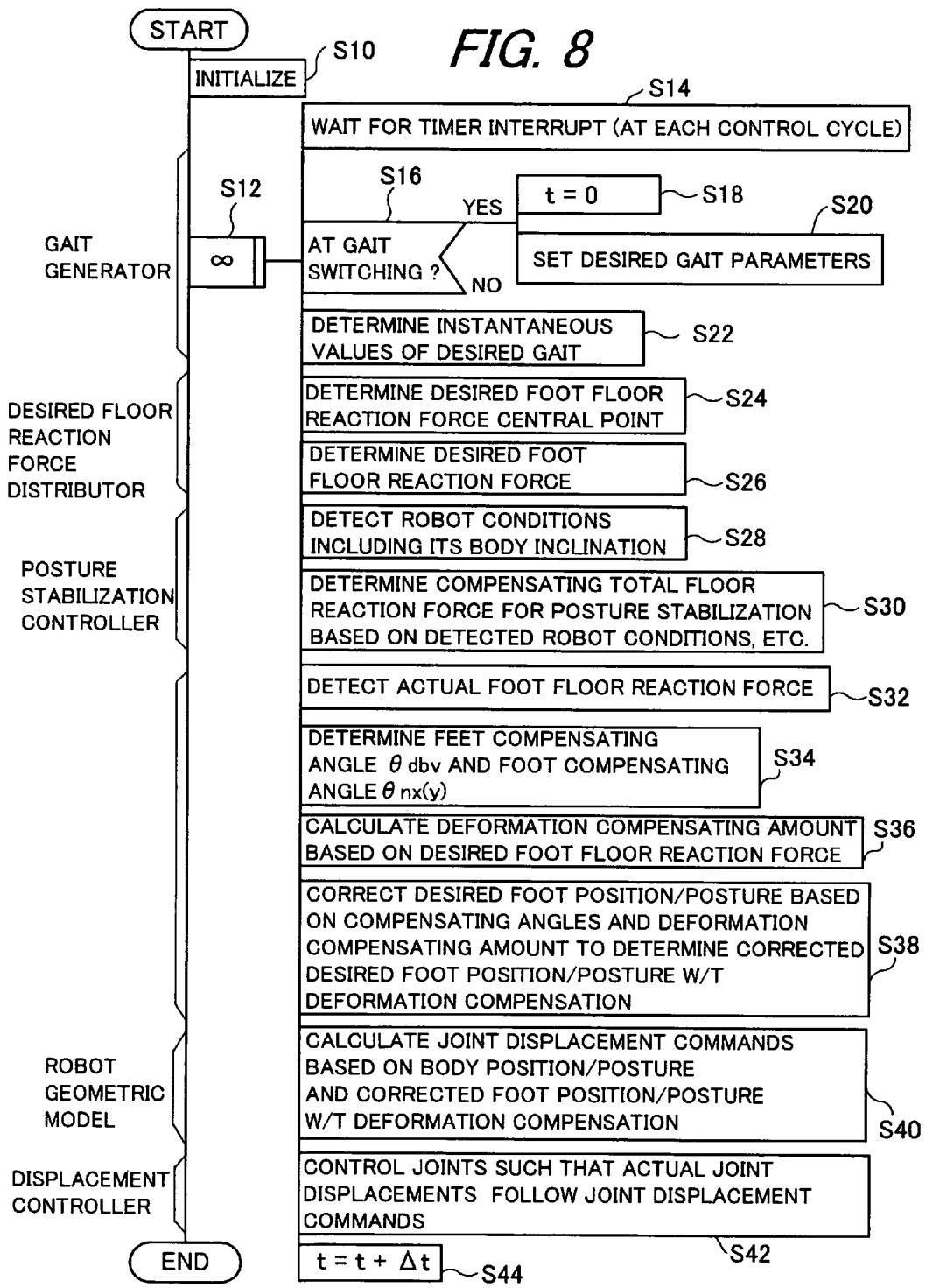
FIG. 8 is a flowchart showing the operation of the legged mobile robot control system shown in FIG. 1.

Resuming the explanation of the flowchart of FIG. 8 against the backdrop of the foregoing explanation, the aforesaid compensating angles are determined in S34 as set out in the foregoing.

The program then proceeds to S36, in which the deformation compensating amount is calculated based on the desired foot floor reaction force, and to S38, in which the desired foot position/posture is corrected in accordance with the compensating angles θdbv, θnx(y) and the result is further corrected in accordance with the deformation compensating amount to obtain the corrected desired foot position/posture with deformation compensation.

The program then proceeds to S40, in which a joint displacement command (value) is calculated from the body position/posture and the corrected desired foot position/posture with deformation compensation, proceeds to S42, in which servo control is performed to make the actual joint displacement follow the calculated joint displacement command (value), proceeds to S44, in which the time is incremented by Δt, and returns to S14 to repeat the foregoing processing.

Among the operations of the legged mobile robot control system according to this embodiment, the operation for holding the bending angle of the toe 22t and that for releasing the same will be explained next with reference to FIGS. 13 to 15.

Figure 13:
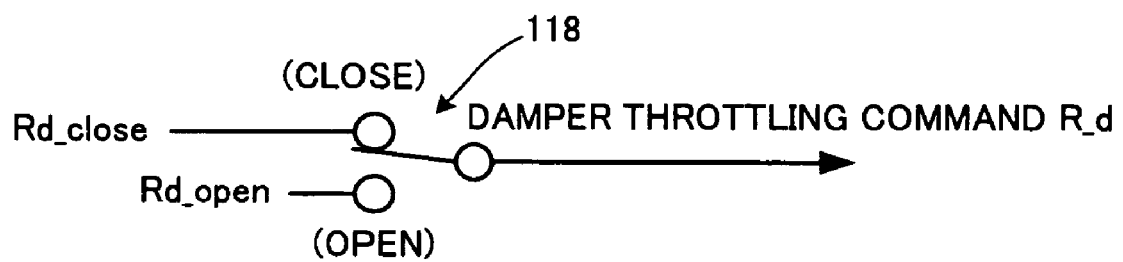
FIG. 13 is a block diagram showing the processing of throttling control of a damper shown in FIG. 2.

FIG. 13 is a block diagram showing a throttling control processing conducted by the damper 50.

As illustrated, the control system is equipped with a select switch 118. Two signals are inputted to the select switch 118, namely, Rd_close (orifice 50d close command, i.e., bending angle holding command) and Rd_open (orifice 50d open command, i.e., held bending angle releasing command), which correspond to two types of control modes of the damper 50, i.e., "CLOSE" and "OPEN." And one or the other thereof is selected at predetermined timing set out later and outputted to the damper 50 as a damper throttling command R_d (specifically, a command value of energization current to the electromagnetic solenoid 50e).

Figure 14:
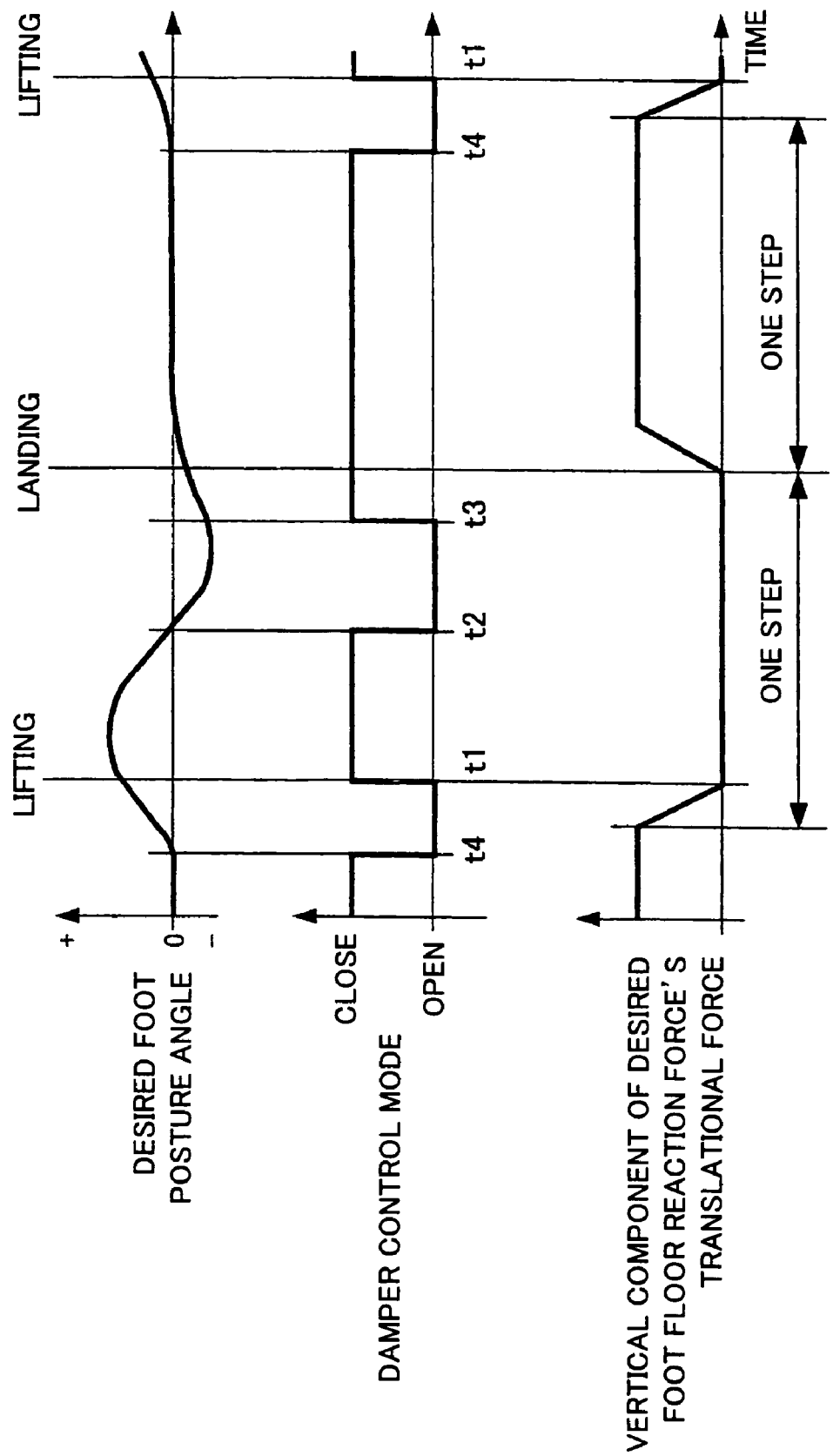
FIG. 14 is a time chart showing the transition of, inter alia, control mode of the damper shown in FIG. 2.

FIG. 14 is a time chart showing the transition of, inter alia, the control mode of the damper 50 when the robot 1 moves over flat terrain. Note that in FIG. 14 the "desired foot posture angle" is zero when the foot 22 is horizontal, and exhibits a positive value when the fore end of the foot 22 is positioned below its hind end and a negative value when the fore end of the foot 22 is positioned above its hind end. Therefore, when, for instance, the leg 2 is landed and the desired foot posture angle has a positive value, this indicates that the robot 1 is standing on tiptoe. Further, the "vertical component of desired foot floor reaction force's translational force" means the force component in the Z-axis direction among the translational components of the floor reaction force that is desired.

To explain the FIG. 14 time chart, "CLOSE" is selected between the first time point t1, which is the liftoff time of the leg 2, and the second time point t2 after liftoff, and "OPEN" is selected between the second time point t2 and third time point t3 before landing of the leg 2. Further, "CLOSE" is again selected between the third time point t3 and fourth time point t4 at which the leg 2 lands and tiptoe standing begins, and "OPEN" is selected between the fourth time point t4 and first time point t1 of the next cycle.

That is, the bending angle of the toe 22t is held at the first time point t1 (the liftoff time of the leg 2) and the held bending angle is released at the second time point t2 after the leg 2 has lifted off. Further, the bending angle of the toe 22t is again held at the third time point t3, which is later in time than the second time point t2 and prior to landing of the leg 2, and the holding of the bending angel is released at the fourth time point t4, after landing of the leg 2 and earlier in time than the first time point t1 of the next cycle.

This will be explained concretely in the following: Between the fourth time point t4 at which tiptoe standing begins and the first time point t1, which is the liftoff time (i.e., during the tiptoe standing period), the held bending angle is released to make the toe 22t bendable, so that the toe 22t is bent in accordance with change in the foot posture angle, thereby securing the contact area necessary for toe-off.

Next, the bending angle at the instant of liftoff is held until the second time point t2 after liftoff (specifically, until the toe 22t has thoroughly separated from the floor).

The toe 22t is then restored to its initial position by releasing the held bending angle at the second time point t2. At this time, the bending angle of the toe 22t decreases progressively and gradually resumes its initial position owing to the flow resistance of the damper 50.

Further, the bending angle of the toe 22t is held in the course of liftoff between the third time point t3, which is later in time than the second time point t2 (more specifically, the time point after the toe 22t resumes the initial position) and the fourth time point t4 at which tiptoe standing begins (in other words, until the foot 22 completes flat ground contact), so that the toe 22t is locked in its initial position to secure maximum contact area at the time of landing and the time of flat ground contact.

Note that the first time point t1 to the fourth time point t4 are all determined based on the desired gait of the robot 1 outputted by the gait generator 100.

Figure 15:
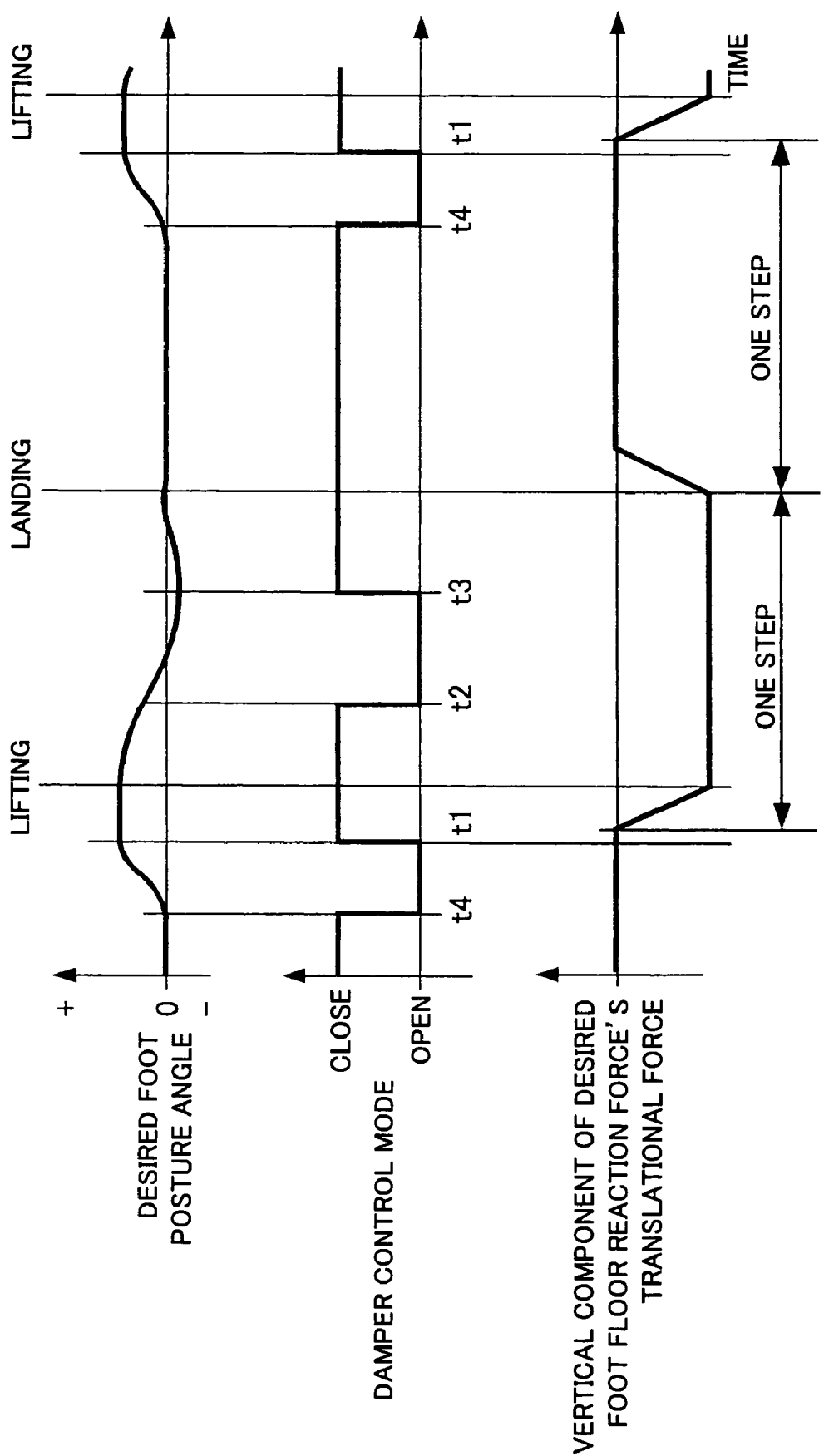
FIG. 15 is a time chart similarly showing the transition of, inter alia, control mode of the damper.

FIG. 15 is a time chart showing the transition of, inter alia, control mode of the damper 50 when the robot 1 climbs stairs.

During stair climbing, a prolonged tiptoe standing period generally occurs at the late stage of the supporting leg. When the period during which the toe 22t is bendable becomes long, the control performance is likely to be degraded because the aforesaid compliance control is a technique for manipulating the postural inclination of the foot so as to suitably control the floor reaction force acting on the robot. Therefore, as shown in FIG. 15, during stair climbing the first time point t1 at which the bending angle of the toe 22t is held, is defined to be a time point that is earlier in time than the liftoff time of the leg 2.

Specifically, as illustrated, the desired foot posture angle is made constant during the latter half of the tiptoe standing period and the bending angle of the toe 22t is held. As a result, the aforesaid compliance control operates effectively during the latter half of the tiptoe standing period, whereby the posture can be stabilized.

Thus the robot 1 according to the first embodiment is equipped with the damper 50 as a bending angle holder capable of holding the bending angle of the toe 22t in the bendable or movable range thereof and the bending angle of the toe 22t is held from the first time point t1 (the liftoff time of the leg 2, or the still earlier-in-time thereof) to the second time point t2 after the leg 2 has lifted off, so that the bending angle at the time of liftoff can continue to be held after liftoff, whereby the robot 1 can be prevented from becoming unstable owing to the toe 22t contacting the floor immediately after liftoff. In addition, the first time point t1 at which holding of the bending angle begins is defined to be a time point earlier than the liftoff time, so that stability during tiptoe standing can be enhanced owing to the fact that the bending angle of the toe 22t can be held (the toe 22t can be locked) also during tiptoe standing.

Further, the bending angle of the toe 22t is held to lock the toe 22t in its initial position from the third time point t3 during liftoff of the leg 2, which is later than the second time point t2, to the fourth time point t4 at which tiptoe standing begins, so that maximum contact area can be secured at the time of landing and the time of flat ground contact.

Further, the damper 50 also functions as a bending angle change suppressor that suppresses change of the bending angle of the toe 22t, so that occurrence of overshooting and vibration can be prevented when the toe 22t restores to the initial position.

Further, the structure of the foot 22 can be made simple because the toe 22t is made continuous with the foot main body 22m and is made of an elastic material that bends with flexing.

SECOND EMBODIMENT

A legged mobile robot and control system thereof according to a second embodiment of this invention will be explained with reference to FIGS. 16 and 17 in the following.

Figure 16:
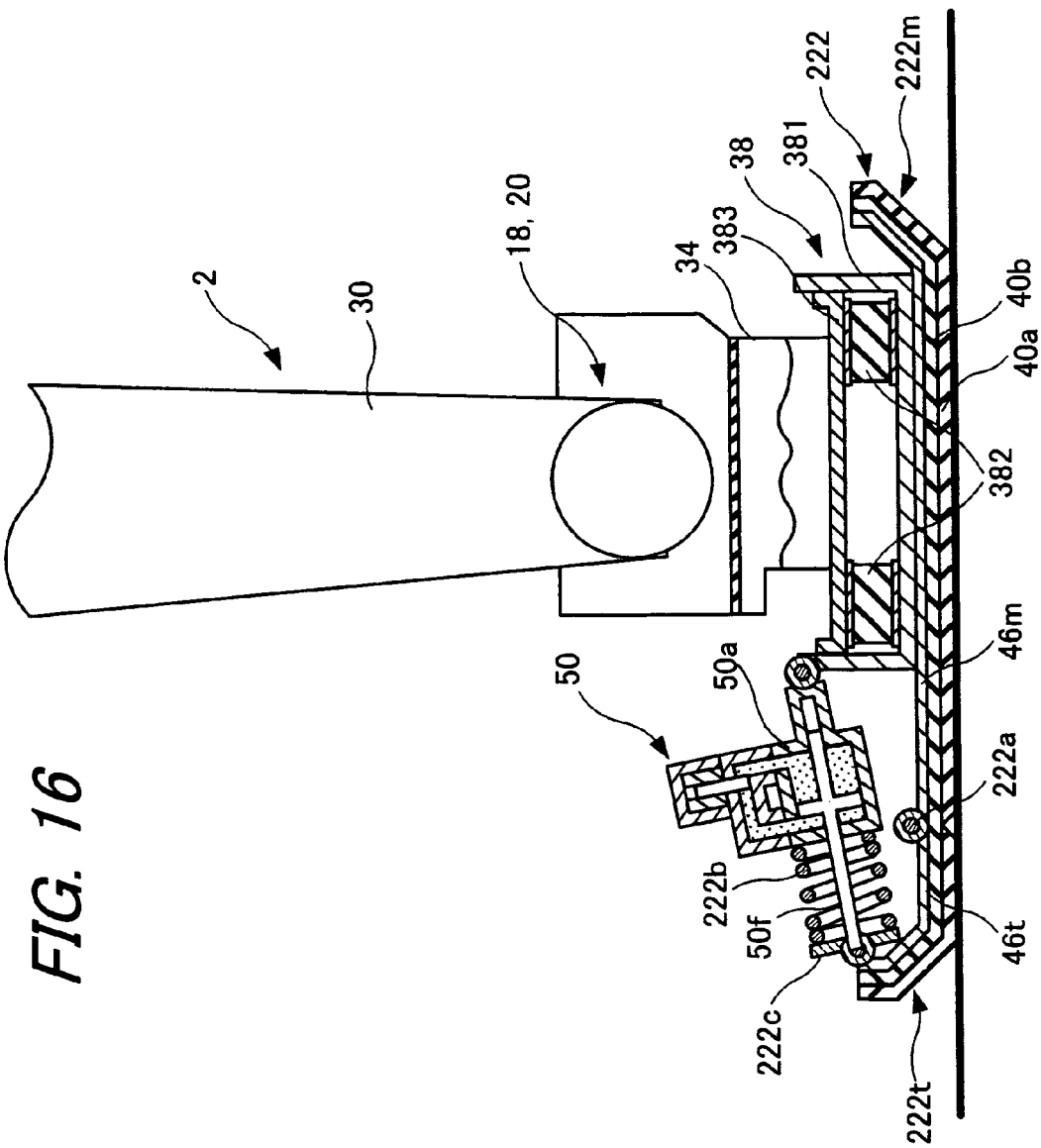
FIG. 16 is an enlarged sectional view showing a foot of a legged mobile robot according to a second embodiment of the invention.
Figure 17:
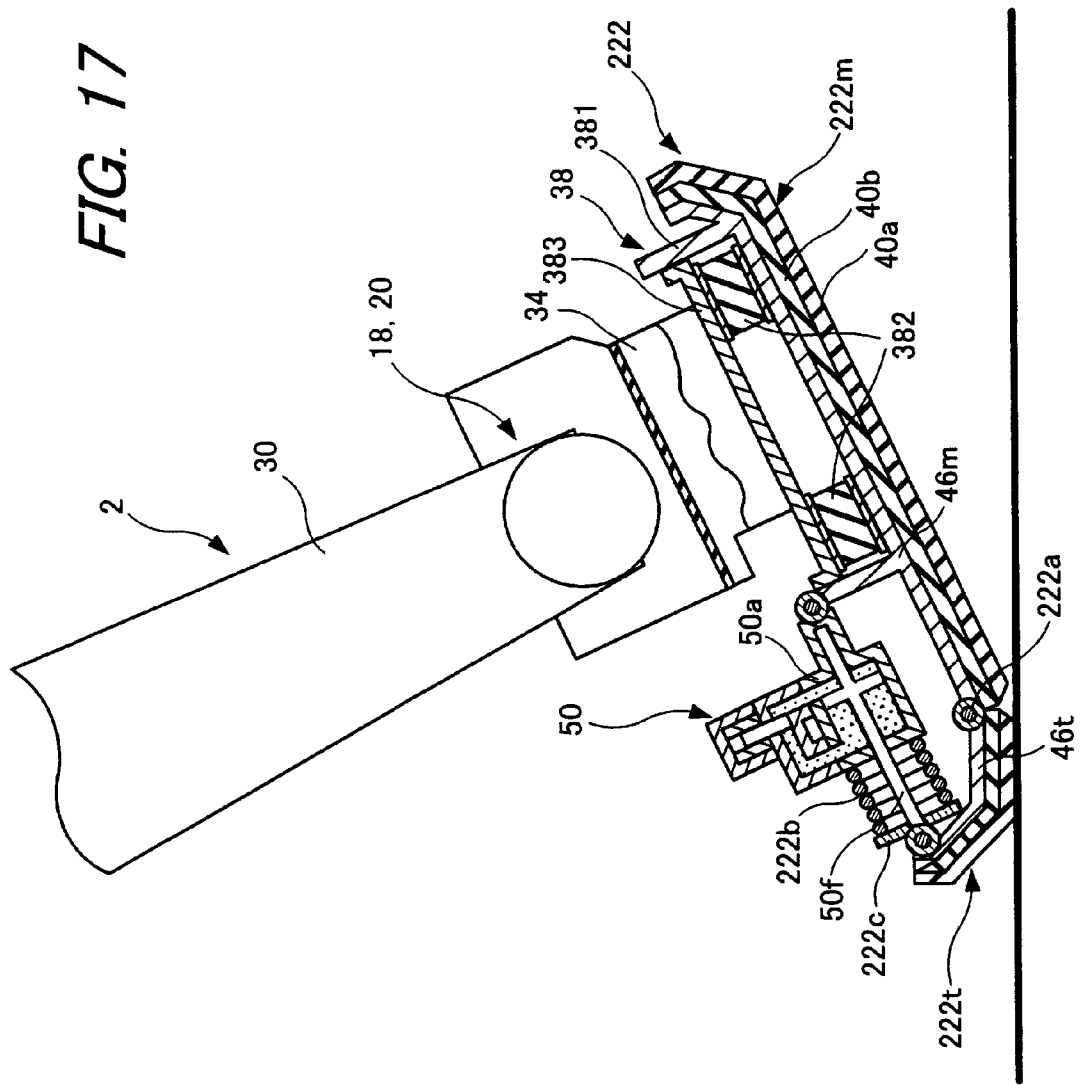
FIG. 17 is an enlarged sectional view similarly showing the foot of the legged mobile robot according to the second embodiment.

FIGS. 16 and 17 are enlarged sectional views showing a foot of the legged mobile robot according to the second embodiment.

An explanation will be made with focus on the points of difference from the first embodiment in the following: As shown in FIGS. 16 and 17, in a foot 222 according to the second embodiment a foot main body 222m and a toe 222t are divided and the two are connected through a rotational shaft 222a capable of rotating about a pitch axis. That is, the toe 222t is made bendable with respect to the foot main body 222m by rotating the rotational shaft 222a.

Further, unlike in the first embodiment, it is not necessary to impart elasticity to the foot because the foot main body 222m and toe 222t are connected through the rotational shaft 222a. So a foot plate 46m on the foot main body 222m side is formed integrally with the spring mechanism unit frame 381 of high-rigidity metal material. Similarly, a foot plate 46t on the toe 222t side is also formed of high-rigidity metal material.

On the other hand, in light of the fact that the foot is not provided with elasticity, a restoring spring 222b is provided for urging the toe 222t in the direction of restoring it to the initial position, thereby assisting restoration of the toe 222t to the initial position. To be specific, the restoring spring 222b is a compression coil spring inserted between a flange 222c provided on the rod head of the piston rod 50f and the cylinder 50a.

Note that explanation of the remainder of the configuration is omitted because it is the same as that of the first embodiment.

Thus in the second embodiment the toe 222t and foot main body 222m are divided and the two are connected through the rotational shaft 222a, so that effects like those of the first embodiment can be obtained. Further, the toe 222t can be bent by rotating the rotational shaft 222a and, therefore, the contact area during the tiptoe standing period can be maintained constant irrespective of how large or small the bending angle. Further, restoration of the toe 222t to the initial position can be performed rapidly because the restoring spring 222b is provided.

THIRD EMBODIMENT

A legged mobile robot and control system thereof according to a third embodiment of this invention will next be explained with reference to FIGS. 18 to 21.

Figure 18:
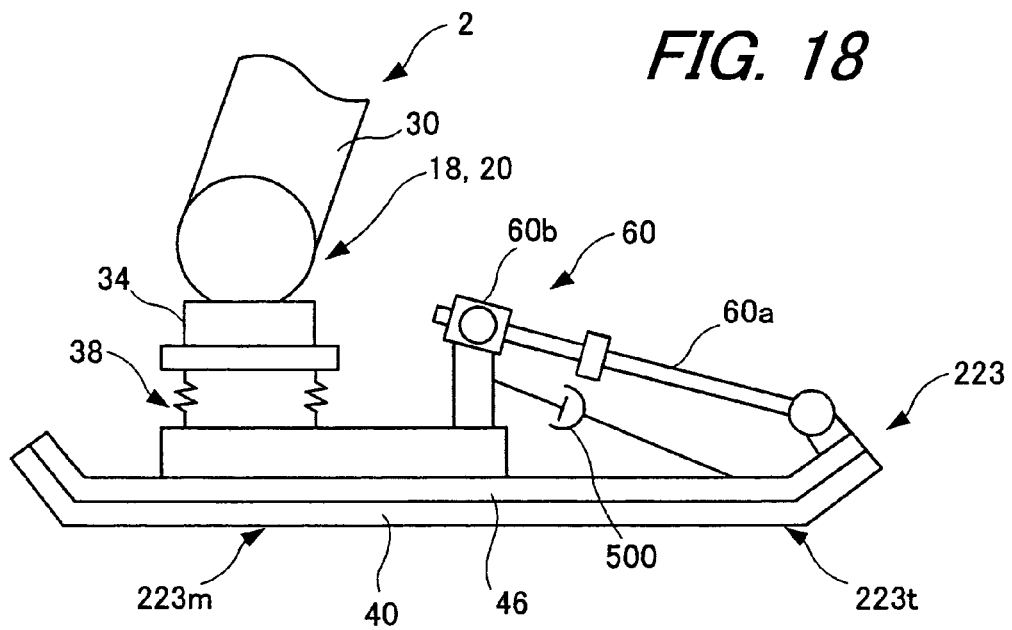
FIG. 18 is a schematic view showing a foot of a legged mobile robot according to a third embodiment of the invention.
Figure 19:
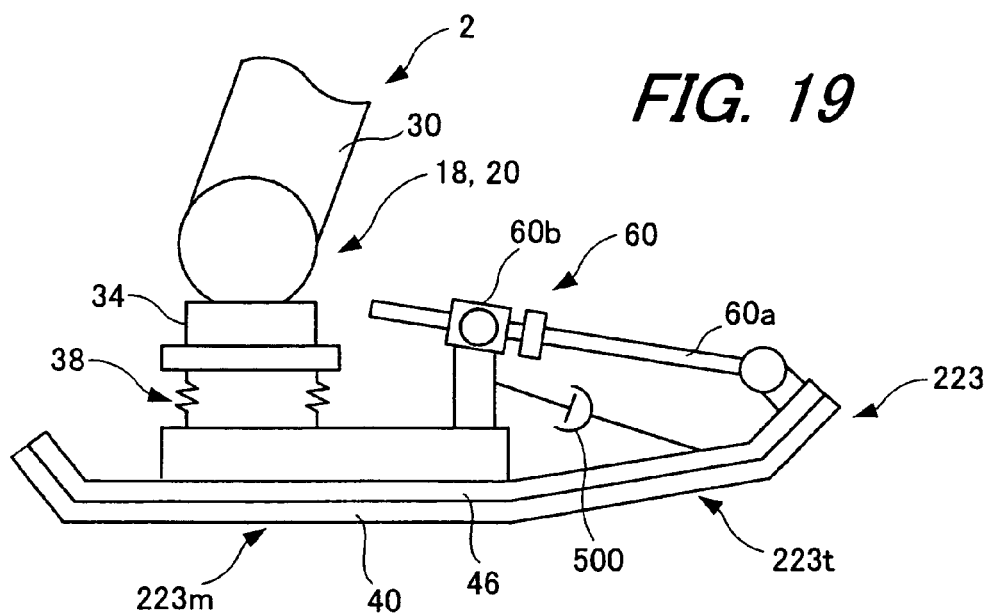
FIG. 19 is a schematic view similarly showing the foot of the legged mobile robot according to the third embodiment.

FIGS. 18 and 19 are schematic views showing a foot of the legged mobile robot according to the third embodiment.

An explanation will be made with focus on the points of difference from the first embodiment: A foot 223 according to the third embodiment is equipped with a friction brake 60 as a bending angle holder capable of holding the bending angle of a toe 223t in the movable range thereof and with a damper 500 as a bending angle change suppressor for suppressing bending angle change.

The friction brake 60 comprises a shaft 60a attached to the fore end of the toe 223t to be rotatable about a pitch axis and a clamping mechanism 60b attached at a suitable position on the foot main body 223m to be rotatable about a pitch axis. The shaft 60a is movably inserted inside the clamping mechanism 60b. When the clamping mechanism 60b is supplied with hydraulic pressure from an unshown hydraulic pressure generating unit, a brake disposed to surround the shaft 60a presses onto the shaft 60a, thereby clamping the shaft 60a. As a result, movement of the shaft 60a is made impossible to hold the bending angle of the toe 223t.

Like the damper 50 mentioned with regard to the first and second embodiments, the damper 500 also uses the flow resistance of a fluid but differs in the following point. That is, the foot 223 of the third embodiment is equipped with the friction brake 60 as the bending angle holder and so the damper 500 is not required to have such function. Therefore, the damper 500 is not equipped with the electromagnetic solenoid provided in the damper 50 for regulating the opening area of the orifice.

Among the operations of the legged mobile robot control system according to the third embodiment, the operation for holding the bending angle of the toe 223t and that for releasing the same will be explained next.

Figure 20:
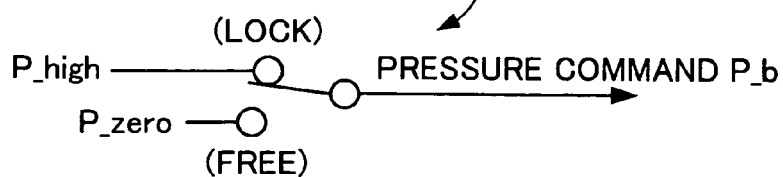
FIG. 20 is a block diagram showing the processing for hydraulic control of a friction brake shown in FIG. 18.

FIG. 20 is a block diagram showing processing for hydraulic control of the friction brake 60.

As illustrated, the control system according to the third embodiment is equipped with a select switch 120. Two signals are inputted to the select switch 120, namely, P_high (high-pressure command, i.e., bending angle holding command) and P_zero (hydraulic pressure supply stop command, i.e., held bending angle releasing command), which correspond to two types of control modes of the friction brake 60, namely, "LOCK" and "FREE." And one or the other thereof is selected at the aforesaid predetermined timing to output a hydraulic command P_b to the hydraulic pressure generating unit.

Figure 21:
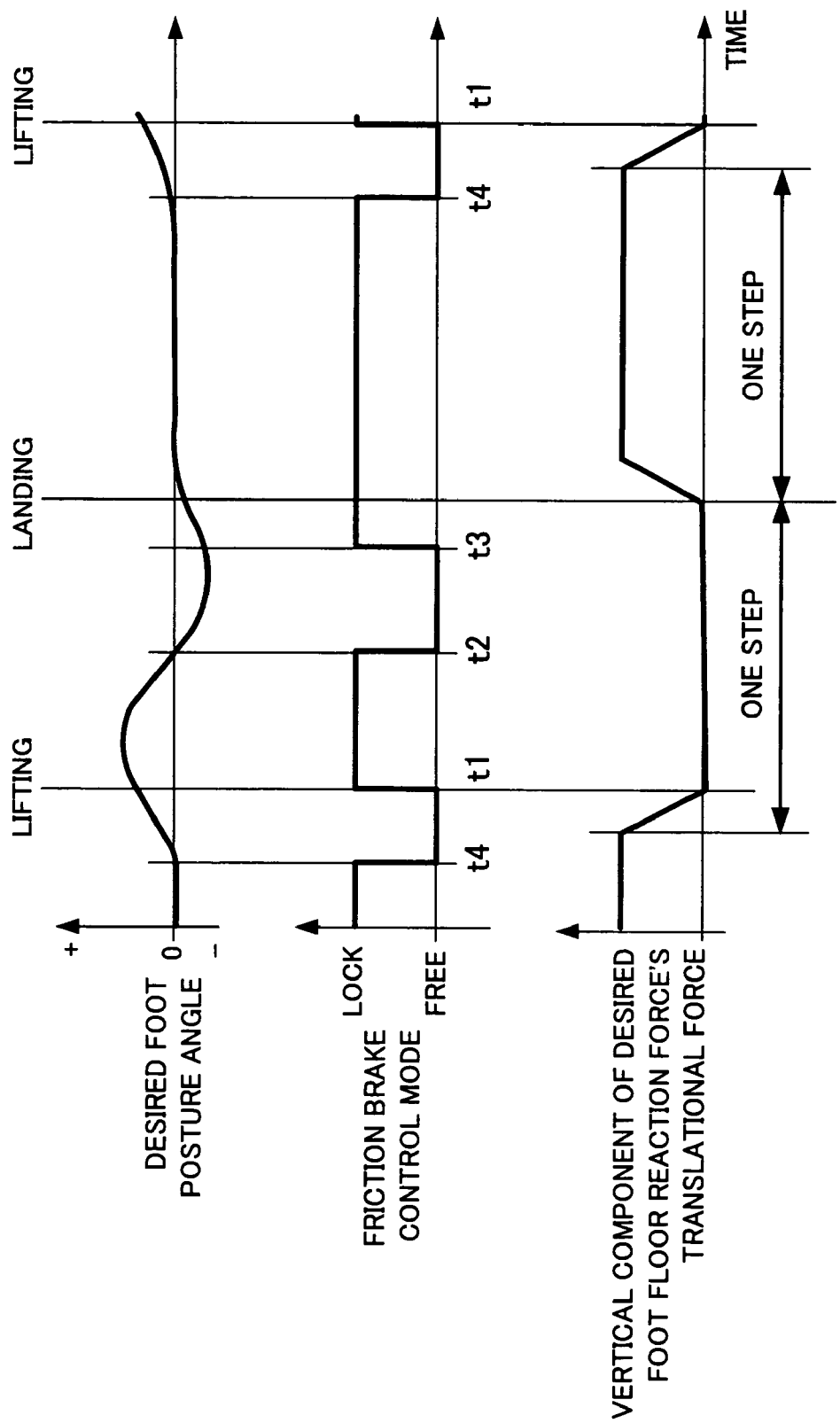
FIG. 21 is a time chart showing the transition of, inter alia, control mode of the friction brake shown in FIG. 18.

FIG. 21 is a time chart showing the transition of, inter alia, the control mode of the friction brake 60 when the robot 1 moves over flat terrain.

As shown in the FIG. 21 time chart, the timing of holding and releasing the bending angle of the toe according to the third embodiment is the same as that in the earlier embodiment (shown in FIG. 14). Further, although omitted in the drawings, also when the robot 1 climbs stairs the holding of the bending angle of the toe and the releasing thereof can be performed at the same timing as that of the earlier embodiment (shown in FIG. 15).

Thus the third embodiment is equipped with the friction brake 60 as the bending angle holder capable of holding the bending angle of the toe 223t in the movable range thereof and with the damper 500 as the bending angle change suppressor for suppressing bending angle change, whereby effects like those of the foregoing embodiments can be obtained.

Note that explanation of the remainder of the configuration is omitted because it is the same as that of the earlier embodiments. Further, the foregoing explanation is also applicable to the case where, in the foot 222 described in the second embodiment, the damper 50 is replaced with the friction brake 60 and damper 500.

FOURTH EMBODIMENT

A legged mobile robot and control system thereof according to a fourth embodiment of this invention will next be explained with reference to FIGS. 22 to 25.

Figure 22:
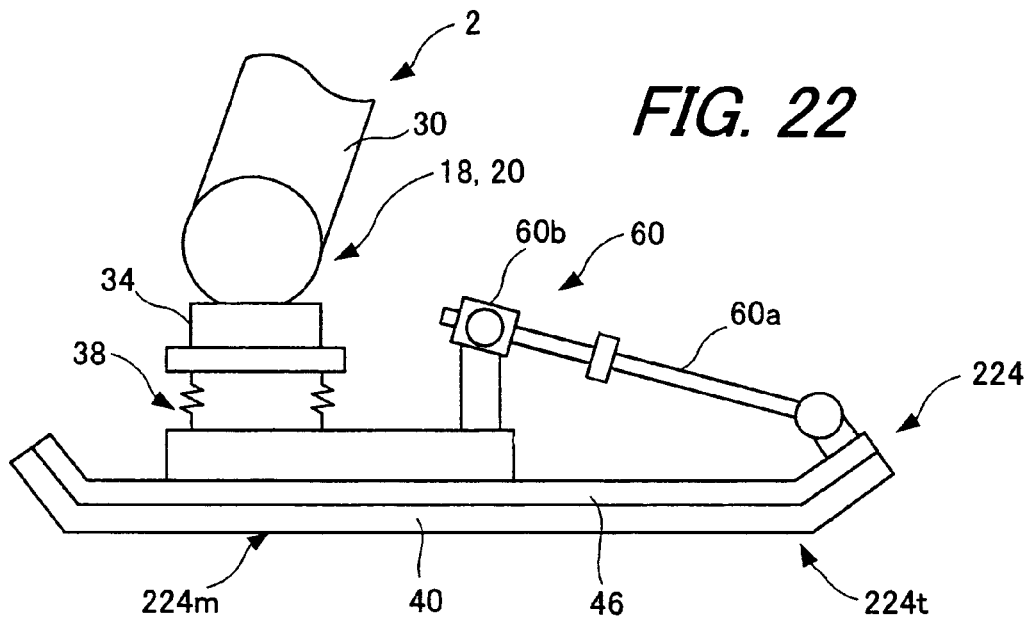
FIG. 22 is a schematic view showing a foot of a legged mobile robot according to a fourth embodiment of the invention.
Figure 23:
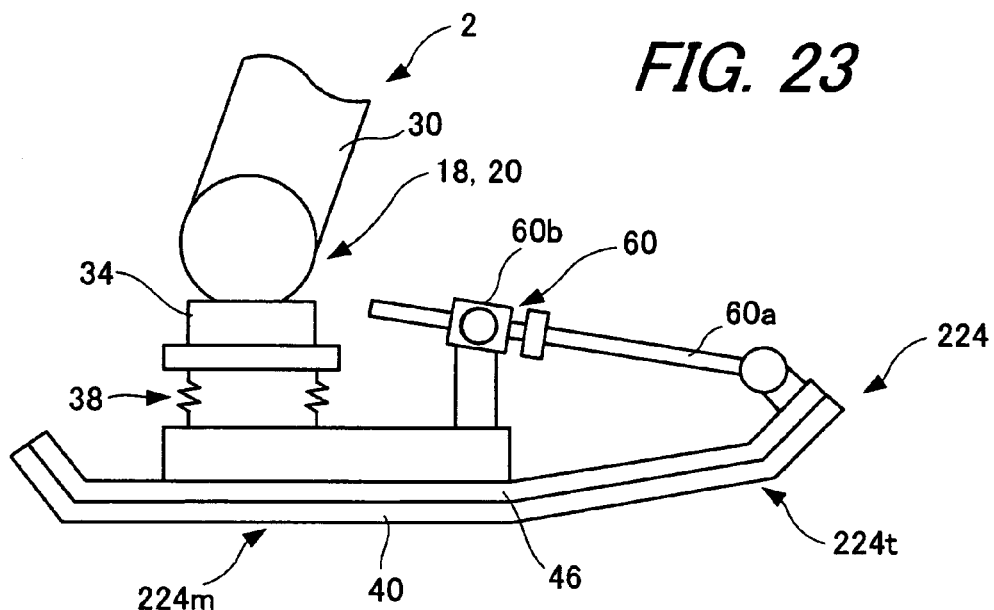
FIG. 23 is a schematic view similarly showing the foot of the legged mobile robot according to the fourth embodiment.

FIGS. 22 and 23 are schematic views showing a foot of the legged mobile robot according to the fourth embodiment.

As shown in FIGS. 22 and 23, a foot 224 according to the fourth embodiment is equipped with the friction brake 60 instead of the damper 50 provided on the foot 22 of the first embodiment.

An explanation will be made regarding the points of difference from the earlier embodiments: In the fourth embodiment, the frictional force of the aforesaid friction brake 60 is made adjustable, whereby the friction brake 60 is made to function as the bending angle change suppressor for suppressing the bending angle change of a toe 224t.

That is, the movement of the shaft 60a is suppressed by determining or setting the hydraulic pressure to be supplied to the friction brake 60 to a value between the aforesaid P_high and P_zero, thereby suppressing change of the bending angle of the toe 224t.

Among the operations of the legged mobile robot control system according to the fourth embodiment, the operation for holding the bending angle of the toe 224t and that for releasing the same will be explained next.

Figure 24:
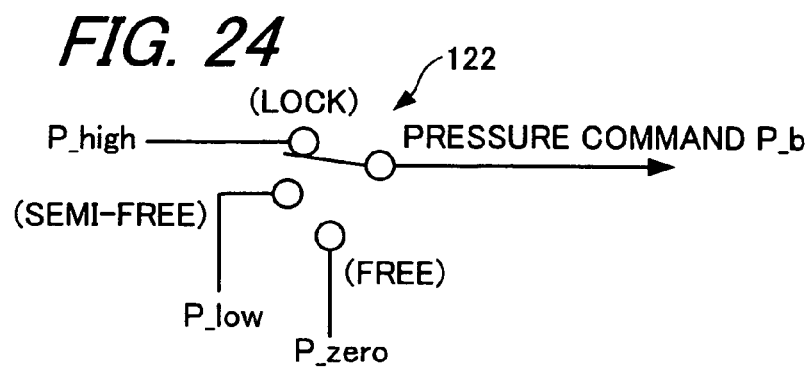
FIG. 24 is a block diagram showing the processing for hydraulic control of a friction brake shown in FIG. 22.

FIG. 24 is a block diagram showing processing for hydraulic control of the friction brake 60.

As illustrated, the control system according to the fourth embodiment is equipped with a select switch 122. Three signals are inputted to the select switch 122, namely, P_high (high-pressure command, i.e., bending angle holding command), P_low (low-pressure command, i.e., bending angle change suppressing command) and P_zero (hydraulic pressure supply stop command, i.e., held bending angle releasing command), which correspond to three types of friction brake 60 control modes, namely, "LOCK," "SEMI-FREE" and "FREE." And one among them is selected at the aforesaid predetermined timing to output a pressure command P_b to the hydraulic pressure generating unit.

Figure 25:
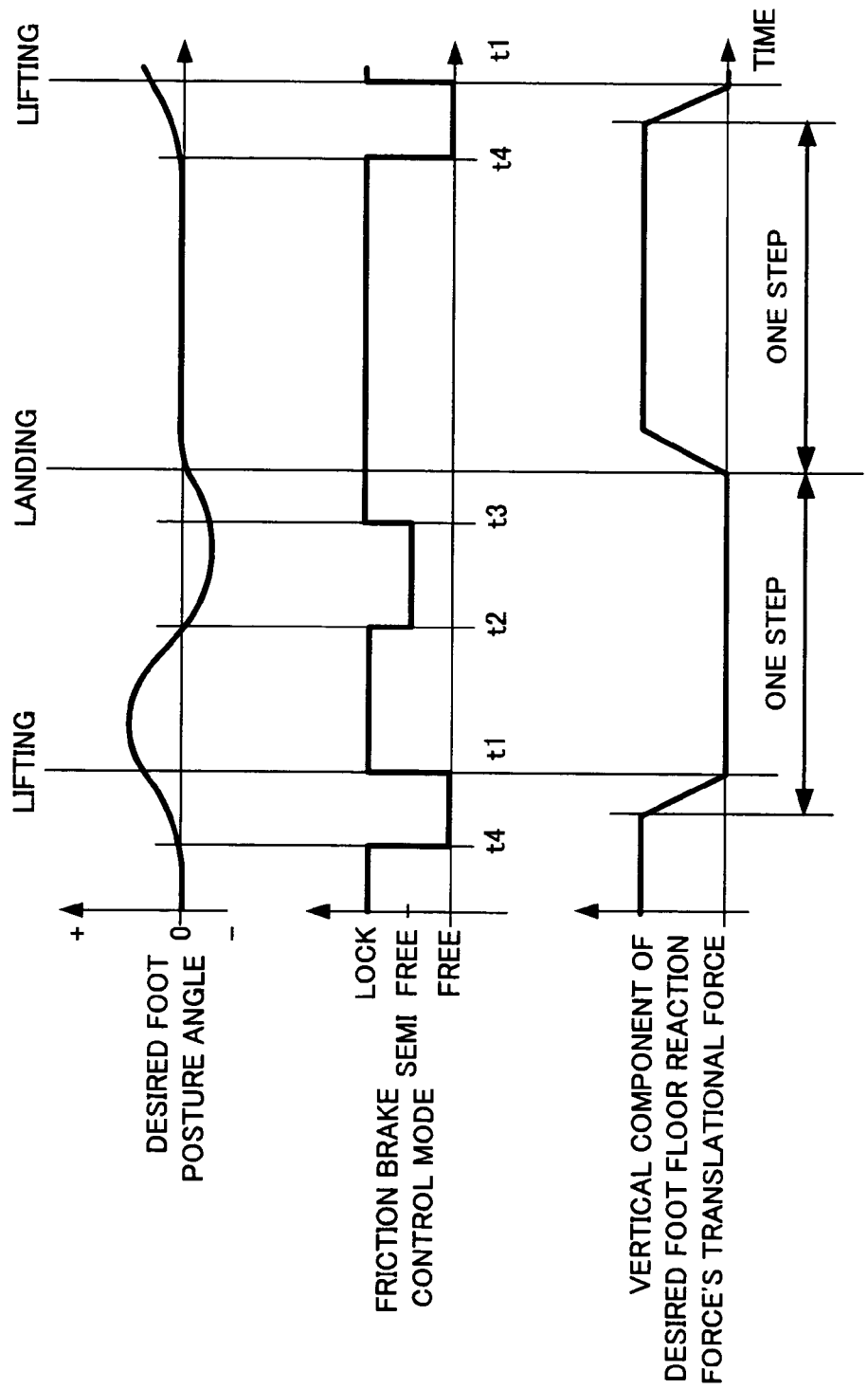
FIG. 25 is a time chart showing the transition of, inter alia, control mode of the friction brake shown in FIG. 22.

FIG. 25 is a time chart showing the transition of, inter alia, the control mode of the friction brake 60 according to the fourth embodiment.

As shown in FIG. 25, in the fourth embodiment, change of the bending angle of the toe 224t is suppressed between the second time point t2 and third time point t3 by selecting "SEMI-FREE" as the control mode of the friction brake 60. That is, the held bending angle of the toe 224t is released at the second time point t2 and the frictional force of the friction brake 60 is simultaneously utilized to reduce the bending angle progressively, thereby gradually restoring it to the initial position. As a result, occurrence of overshooting and vibration can be prevented when the toe 224t restores to the initial position.

Note that FIG. 25 is a time chart for when the robot 1 moves over flat terrain, and when it climbs stairs, it suffices to set the first time point t1 to a time point before the liftoff time of the leg, as in the earlier embodiments. Further, explanation of the remainder of the configuration is omitted because it is the same as that of the earlier embodiments.

Further, the foregoing explanation is also applicable to the case where, in the foot 222 described in the second embodiment, the damper 50 is replaced with the friction brake 60.

FIFTH EMBODIMENT

A legged mobile robot and control system thereof according to a fifth embodiment of this invention will next be explained with reference to FIGS. 26 to 29.

Figure 26:
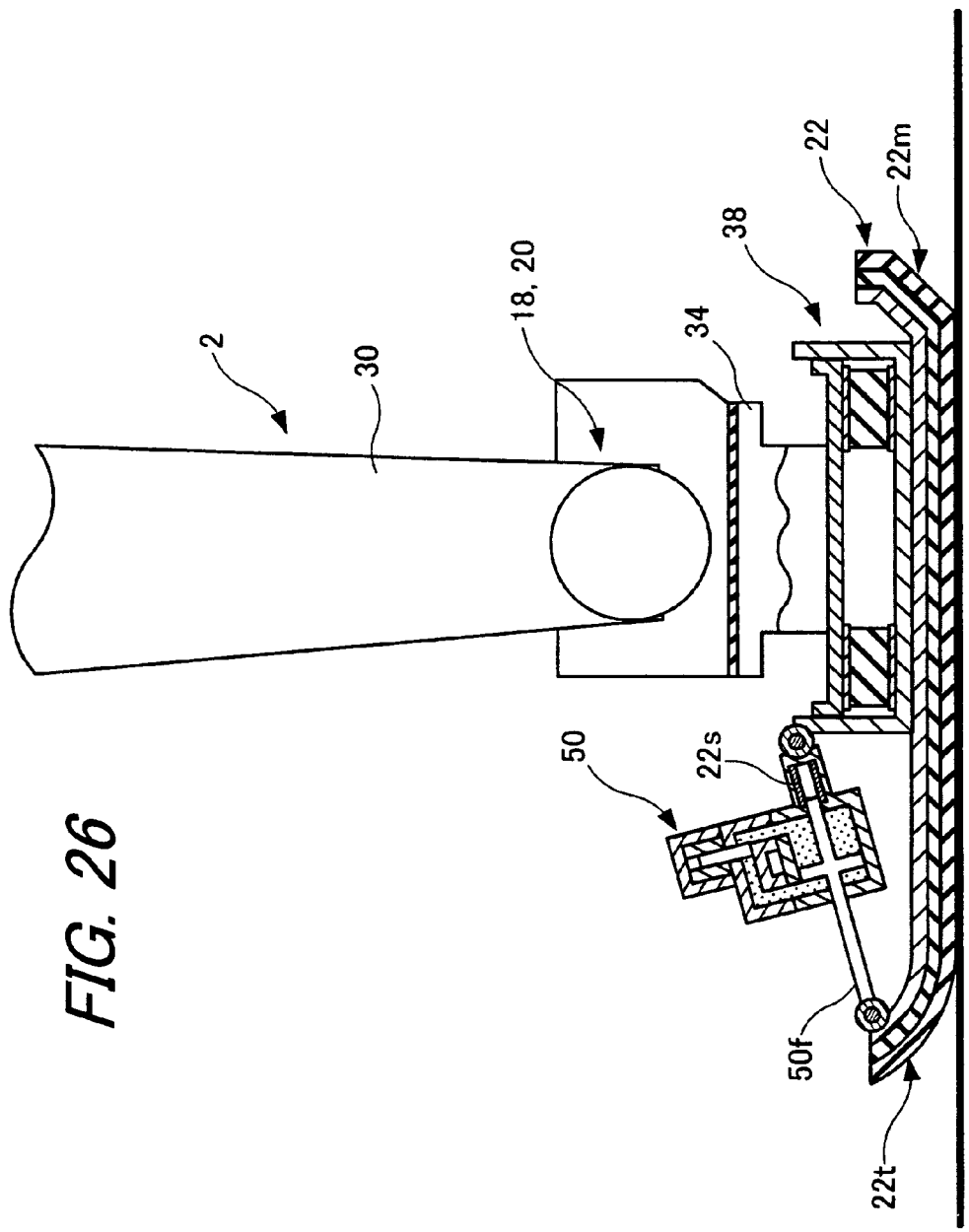
FIG. 26 is an enlarged sectional view showing a foot of a legged mobile robot according to a fifth embodiment of the invention.
Figure 27:
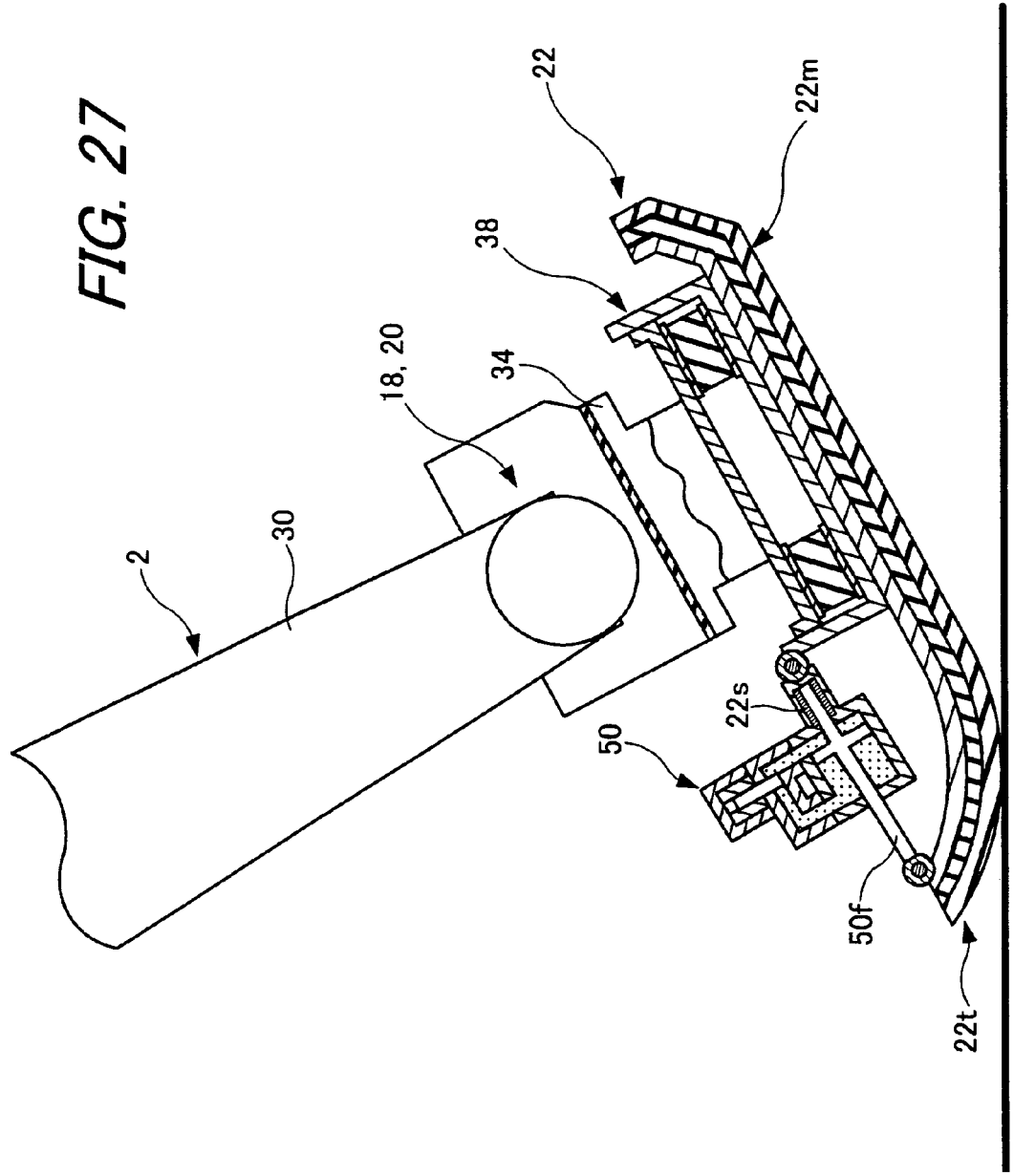
FIG. 27 is an enlarged sectional view similarly showing the foot of the legged mobile robot according to the fifth embodiment.

FIGS. 26 and 27 are enlarged sectional views showing a foot of the legged mobile robot according to the fifth embodiment.

As shown in FIGS. 26 and 27, in the fifth embodiment, the damper 50 of the first embodiment, installed on the foot 22, is provided internally with a stroke sensor 22s (linear encoder, potentiometer or the like) for detecting the displacement (stroke) of the piston rod 50f. Note that the detection value of the stroke sensor 22s is inputted to the RAM 64 of the aforesaid control unit 26.

As illustrated, the stroke of the piston rod 50f varies with the bending angle of the toe 22t. That is, detecting the stroke of the piston rod 50f amounts to detecting the bending angle of the toe 22t. The detection value of the stroke sensor 22s will hereinafter be treated as the detected value of the bending angle of the toe 22t.

The control system of the legged mobile robot according to the fifth embodiment will be explained next.

In the fifth embodiment, the aforesaid first time point t1 and third time point t3 are determined based on the detected value of the bending angle of the toe 22t.

Specifically, when the detected value of the bending angle reaches a predetermined value after the held bending angle of the toe 22t has been released at the fourth time point t4, that time point is determined as the first time point t1 to hold the bending angle. Further, when the detected value of the bending angle reaches zero after the held bending angle of the toe 22t has been released at the second time point t2, that time point is determined as the third time point t3 to hold the bending angle again.

Note that explanation of the remainder of the configuration is omitted because it is the same as that of the earlier embodiments.

Thus, in the fifth embodiment, a sensor is provided for detecting the bending angle of the toe 22t, and the first and third time points t1, t3 at which holding of the bending angle is commenced are determined based on the detected value, whereby in addition to achieving the effects set forth regarding the earlier embodiments it is possible to perform the operations for holding the bending angle of the toe 22t at more suitable time points.

Figure 28:
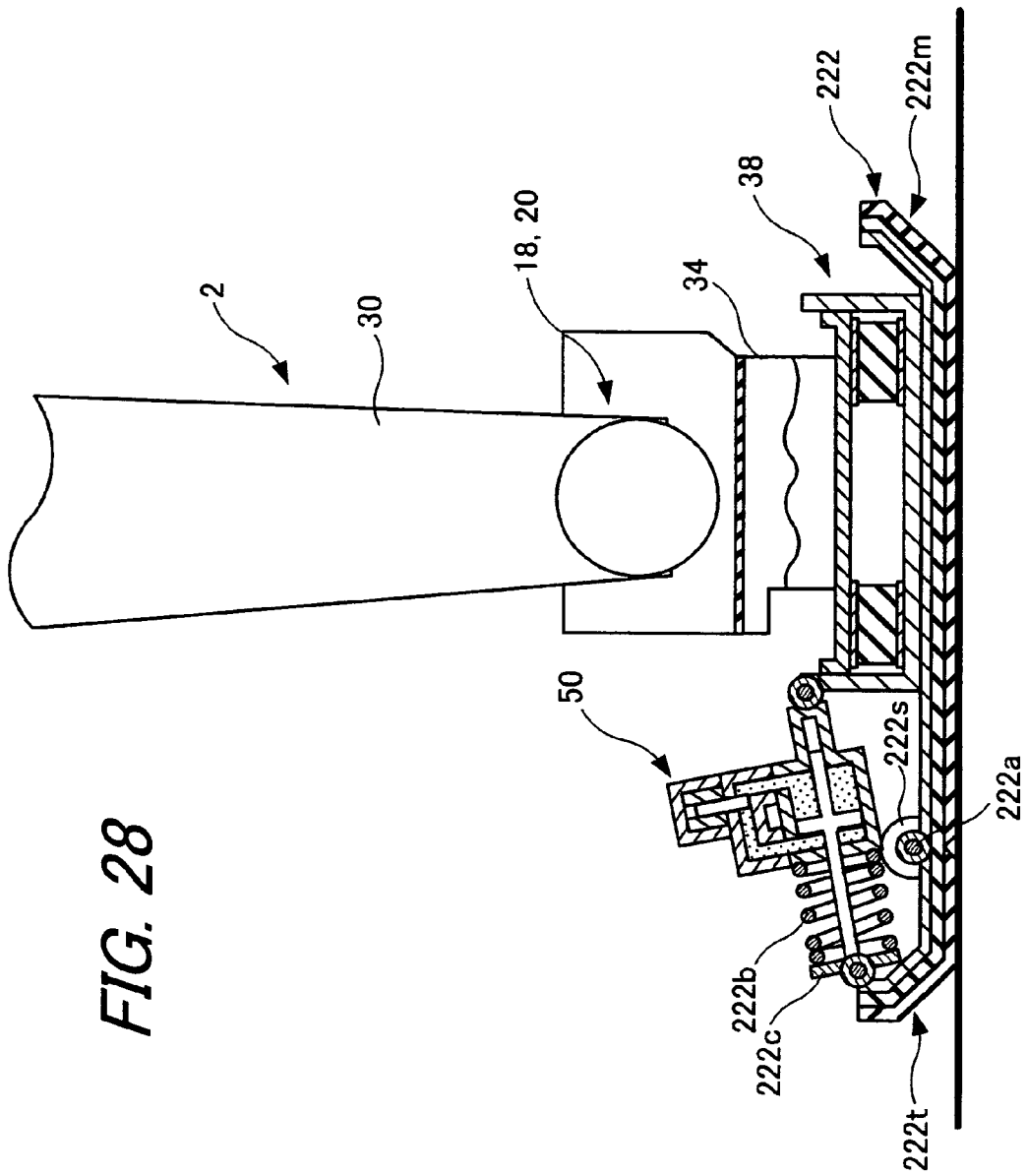
FIG. 28 is an enlarged sectional view similarly showing the foot of the legged mobile robot according to the fifth embodiment.
Figure 29:
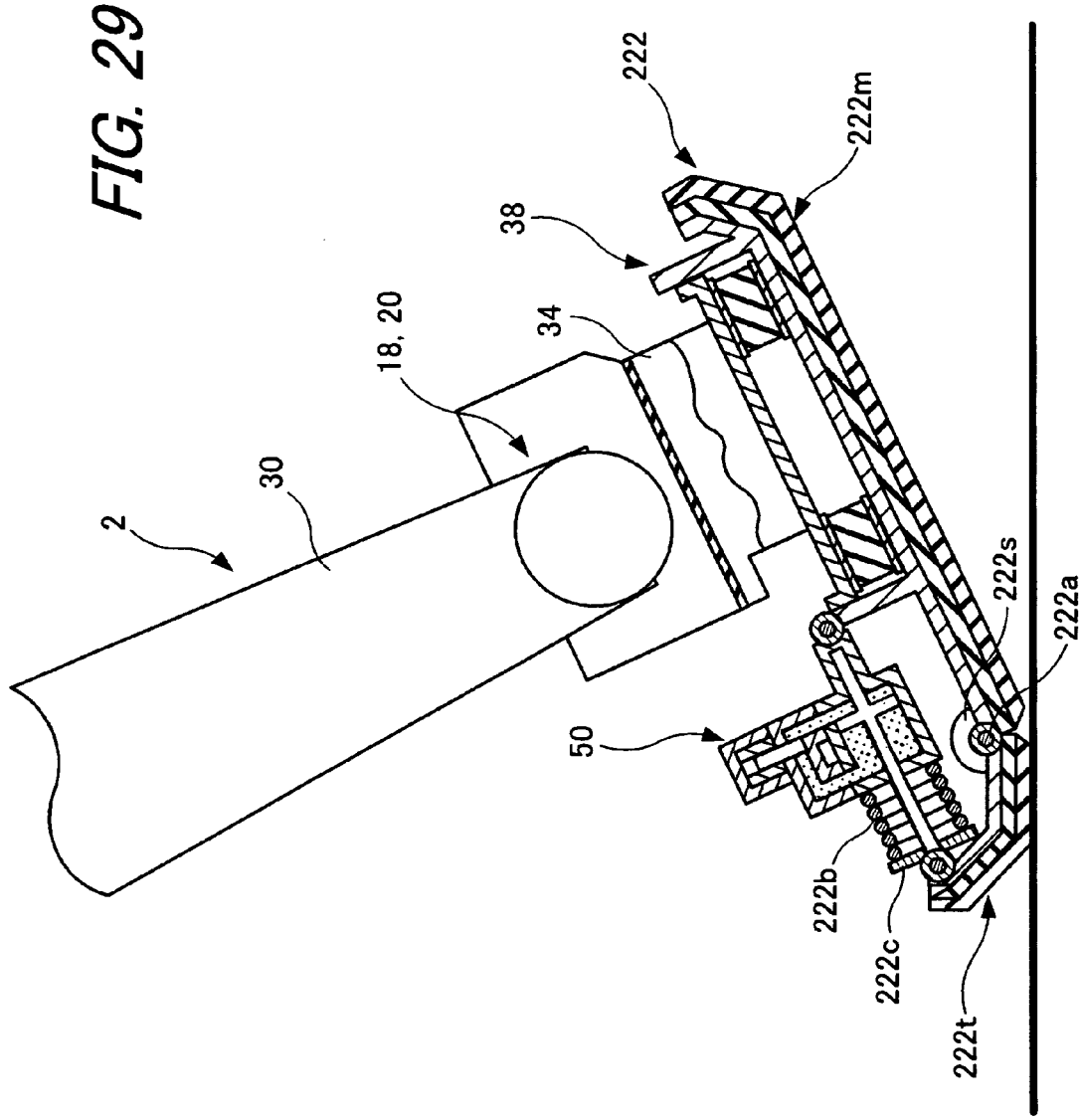
FIG. 29 is an enlarged sectional view similarly showing the foot of the legged mobile robot according to the fifth embodiment.

Note that the foregoing explanation is also applicable to the case where, as shown in FIGS. 28 and 29, a rotation angle sensor 222s (rotary encoder, rotary potentiometer or the like) is provided on the foot 222 of the second embodiment for detecting the rotation angle of the rotational shaft 222a, thereby detecting the bending angle of the toe 222t. Further, it is also applicable in the case where the aforesaid sensor is provided on the foot explained regarding the third embodiment or fourth embodiment.

SIXTH EMBODIMENT

A legged mobile robot and control system thereof according to a sixth embodiment of this invention will next be explained with reference to FIGS. 30 to 32. Note that the following explanation is premised on a legged mobile robot equipped with the foot 224 explained regarding the fourth embodiment.

In the sixth embodiment, the friction brake 60 is operated to control the floor reaction force's moment during the tiptoe standing period.

As the main points of difference from the earlier embodiments are in the processing of the aforesaid foot compensating angle determiners 114c-114f and the operation of the bending angle change suppressor, an explanation will be made with focus on these points in the following.

Figure 30:
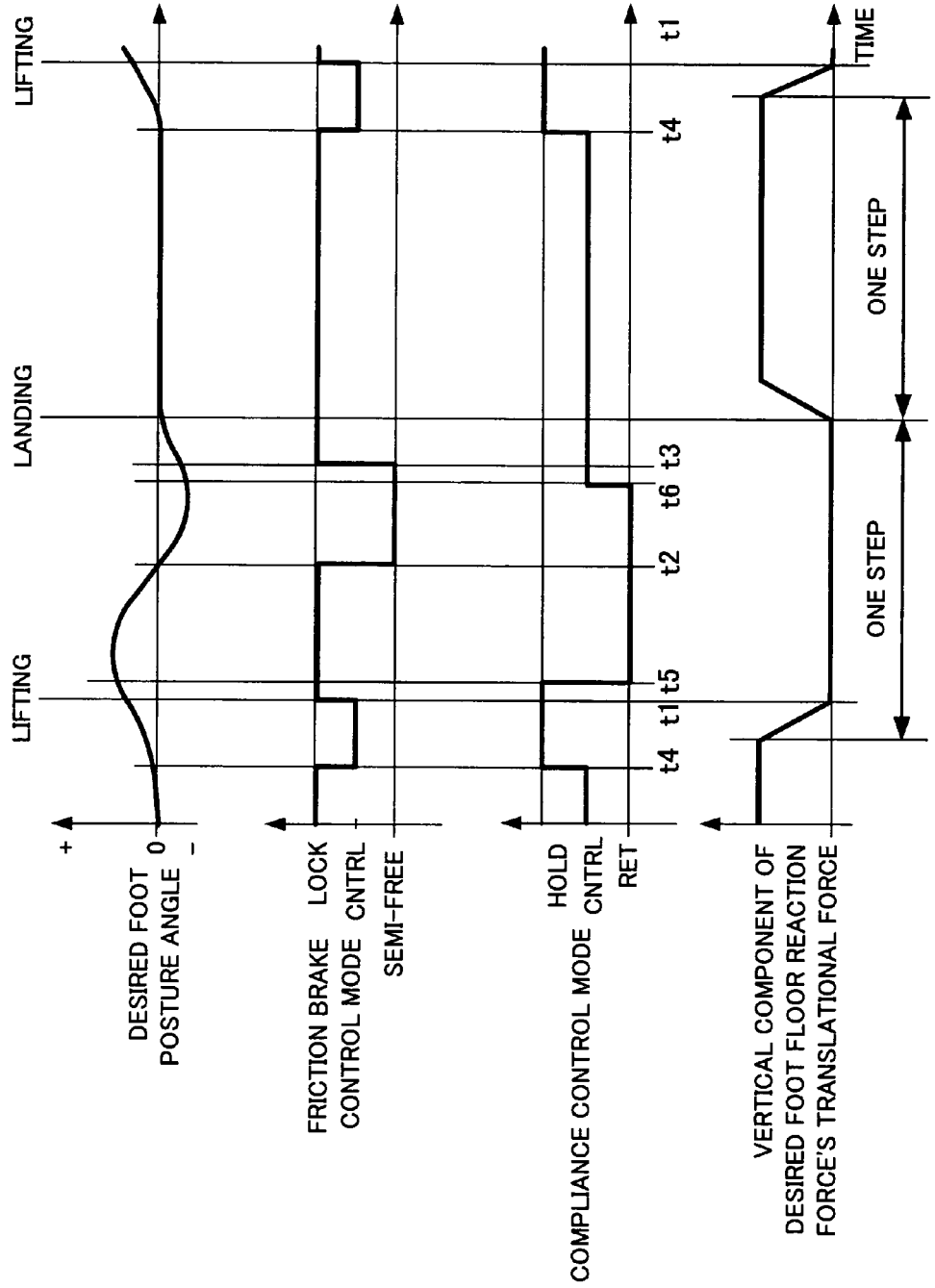
FIG. 30 is a time chart showing the transition of, inter alia, control mode of a legged mobile robot according to a sixth embodiment of the invention.

FIG. 30 is a time chart showing the transition of, inter alia, the control mode of the friction brake 60 according to the sixth embodiment.

As shown in FIG. 30, the control mode of the friction brake 60 according to this embodiment comprises three types: "LOCK," "CNTRL" and "SEMI-FREE." Further, the compliance control mode (explained later) comprises three types: "HOLD," "CNTRL" and "RET."

Figure 31:
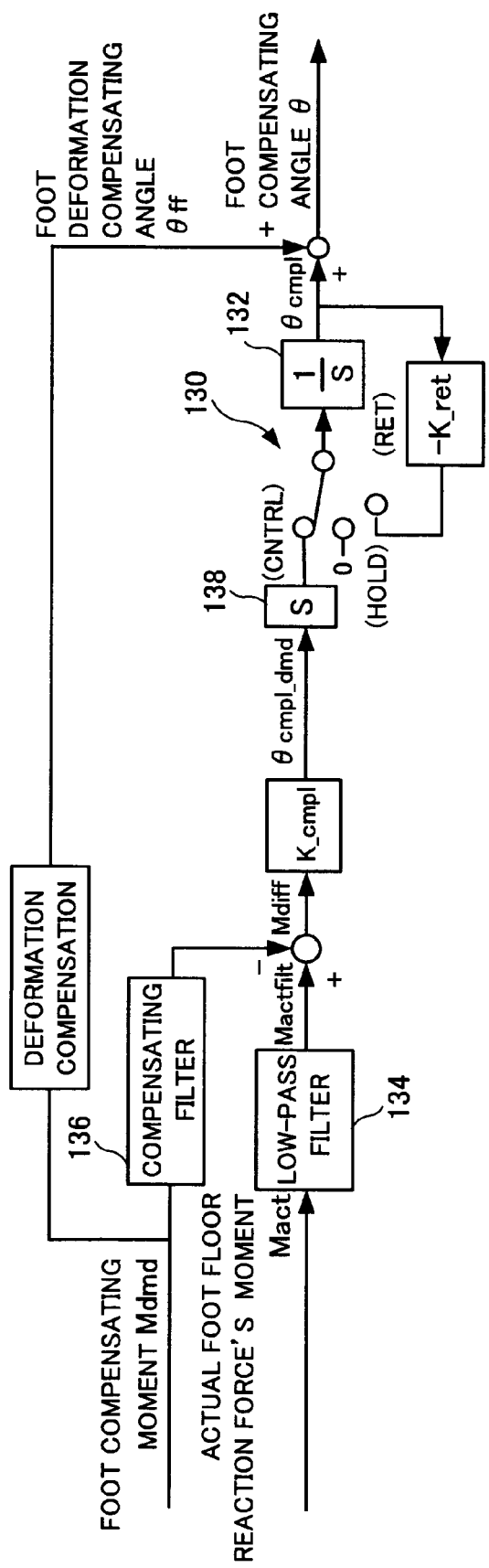
FIG. 31 is a block diagram showing the calculation processing of a foot compensating angle determiner of a legged mobile robot control system according to the sixth embodiment.

FIG. 31 is a block diagram showing the processing of the compensating angle determiner of the legged mobile robot control system according to the sixth embodiment. Note that the 1st foot X-compensating angle $\theta 1x$, 1st foot Y-compensating angle $\theta 1y$, 2nd foot X-compensating angle $\theta 2x$ and 2nd foot Y-compensating angle $\theta 2y$ are all determined by the same algorithm and, therefore, mention of the leg serial numbers (n: 1, 2) and X, Y is omitted in the following.

What characterizes the processing shown in FIG. 31 is that a select switch 130 is provided and the input of an integrator 132 is switched in accordance with the compliance control mode.

To begin with, an explanation will be made regarding the processing when "CNTRL" is selected as the compliance control mode (the select switch 130 is connected to the "CNTRL" side). First, the actual foot floor reaction force's moment Mact is passed through a low-pass filter 134 for preventing oscillation to obtain Mactfilt. Further, the foot compensating moment Mdmd is passed through a compensating filter 136 to subtract it from Mactfilt and obtain the deviational moment Mdiff. Like the one shown in FIG. 12, the compensating filter 136 is for enhancing the frequency response characteristic of the transfer function from the foot compensating moment Mdmd to the actual total floor reaction force.

The deviational moment Mdiff is then multiplied by K_cmpl (control gain) to determine a compliance control compensating demand angle θcmpl_dmd, which after being differentiated by a differentiator 138, is further integrated by the integrator 132 to obtain a compliance control compensating angle θcmpl.

Next, similarly to the processing shown in FIG. 12, the feet deformation compensating angle θff is determined and added to the compliance control compensating angle θcmpl to obtain the foot compensating angle θ.

Note that the compliance control compensating angle θcmpl is substantially equal to the compliance control compensating demand angle θcmpl_dmd because before entering the "CNTRL" mode it is substantially zero in the "RET" mode explained next.

Next, an explanation will be made regarding the processing when "RET" is selected as the compliance control mode. When "RET" is selected as the compliance control mode, the select switch 130 is connected to the RET side, so that the value obtained by multiplying the compliance control compensating angle θcmpl by –K_ret is inputted to the integrator 132. As a result, the change rate of the compliance control compensating angle θcmpl becomes –K_ret*θcmpl. That is, the compliance control compensating angle θcmpl gradually returns to zero by the step response of a first-order delay system of time constant 1/K_ret.

On the other hand, when "HOLD" is selected as the compliance control mode, the select switch 130 is connected to the HOLD side, so that zero is inputted to the integrator 132. That is, the value up to then is held as the compliance control compensating angle θcmpl.

Next, an explanation will be made regarding the hydraulic control of the friction brake 60 in accordance with the sixth embodiment. FIG. 32 is a block diagram showing the processing of this control.

Figure 32:
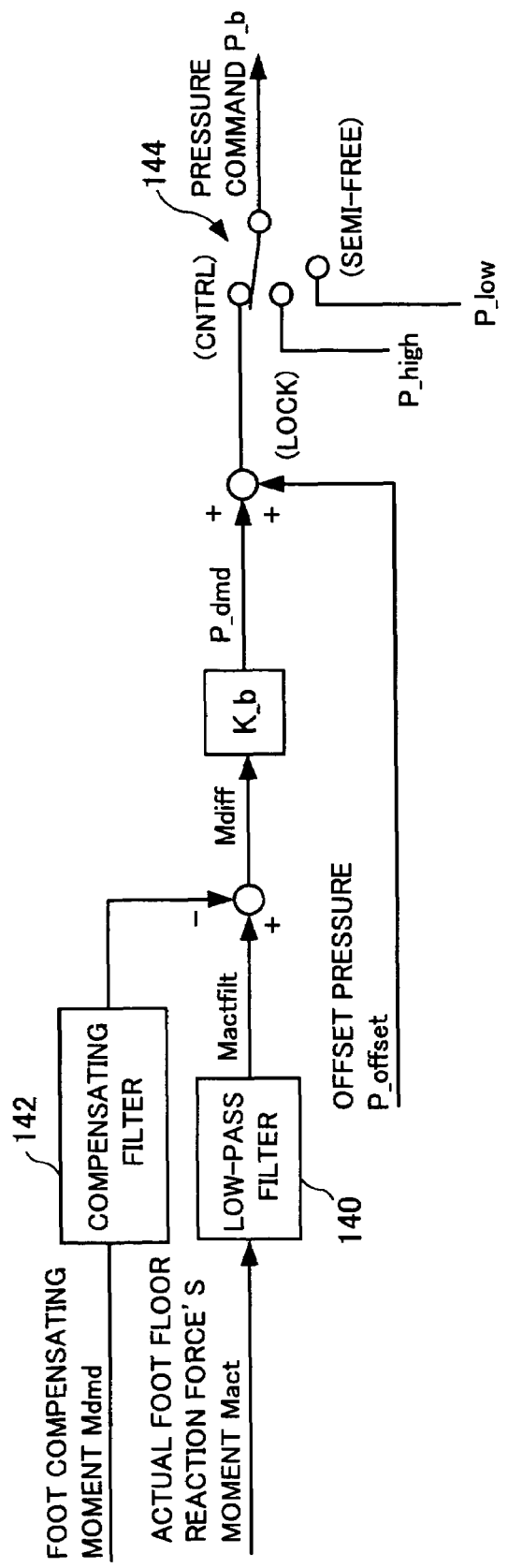
FIG. 32 is a block diagram showing the processing for hydraulic control of a friction brake according to the sixth embodiment.

To explain FIG. 32, first, the actual foot floor reaction force's moment Mact is passed through a low-pass filter 140 for preventing oscillation to obtain Mactfilt. Further, the foot compensating moment Mdmd is passed through a compensating filter 142 for frequency response characteristic enhancement to subtract it from Mactfilt and obtain the deviational moment Mdiff.

Next, the deviational moment Mdiff is multiplied by K_b (control gain) to determine a pressure demand P_dmd and the value obtained by adding an offset pressure P_offset thereto is outputted to the hydraulic pressure generating unit as the pressure command P_b.

Note that the foregoing is the processing when, as illustrated, "CNTRL" has been selected as the friction brake control mode and a select switch 144 is connected to the CNTRL side; and when "LOCK" or "SEMI-FREE" has been selected, then similarly to in the fourth embodiment, P_high (bending angle holding command) or P_low (held bending angle releasing command) is outputted to the hydraulic pressure generating unit through the select switch 144 as the hydraulic command P_b.

To explain the FIG. 30 time chart in light of the foregoing, "HOLD" is selected as the compliance control mode between the fourth time point t4 and fifth time point t5 after liftoff. Further, "RET" is selected between the fifth time point t5 and sixth time point t6 before landing of the leg 2 (i.e., for a given part of swing). Further, "CNTRL" is selected between the sixth time point t6 and fourth time point t4 of the next cycle (i.e., from before landing of the leg 2 to completion of flat ground contact (start of tiptoe standing)).

To explain this more spefically, ordinary compliance control is conducted between the sixth time point t6 before the leg 2 lands and the fourth time point t4 at which flat ground contact is completed. On the other hand, the compliance control compensating angle θcmpl at the time of flat ground contact completion is held between the fourth time point t4 at which the robot 1 begins tiptoe standing and the fifth time point t5 at which the leg 2 lifts off (i.e., for a period including at least the tiptoe standing period). Then, in preparation for compliance control in the next cycle, the compliance control compensating angle θcmpl is returned to zero during the liftoff period between the fifth time point t5 and sixth time point t6 of the next cycle.

What is characteristic here, is that the control mode of the friction brake 60 is set to "CNTRL" between the fourth time point t4 and first time point t1 of the next cycle (i.e., during the tiptoe standing period). That is, during this period, instead of conducting ordinary compliance control, the hydraulic pressure supplied to the friction brake 60 is controlled to regulate its frictional force, thereby regulating the bending angle of the toe 224t to control the floor reaction force's moment. As a result, posture stability during the tiptoe standing period can be further enhanced.

Note that explanation of the remainder of the configuration is omitted because it is the same as that of the earlier embodiments. However, differently from the earlier embodiments, the sixth embodiment does not necessarily require the first time point t1 to be different between when the robot 1 is moving over flat terrain and when it is climbing stairs, because the configuration is such that the bending angle of the toe 224t is regulated to control the floor reaction force's moment during the tiptoe standing period.

Further, although the sixth embodiment has bee explained premised on the legged mobile robot according to the fourth embodiment, it can also be applied to the legged mobile robots of the other embodiments provided that the friction brake 60 is provided on the foot.

SEVENTH EMBODIMENT

A legged mobile robot and control system thereof according to a seventh embodiment of this invention will next be explained with reference to FIGS. 33 and 34. Note that the following explanation is premised on a legged mobile robot equipped with the foot 22 explained regarding the first embodiment.

The damping characteristic of the damper 50 (i.e., the magnitude of the resistance produced by the damper 50; in other words, the bending angle change suppressing force) can be regulated as desired by operating the electromagnetic solenoid 50e to vary the opening area of the orifice 50d. So in the seventh embodiment, during the tiptoe standing period, the damping characteristic of the damper 50 is regulated to regulate the bending angle of the toe 22t and thereby control the floor reaction force's moment.

Figure 33:
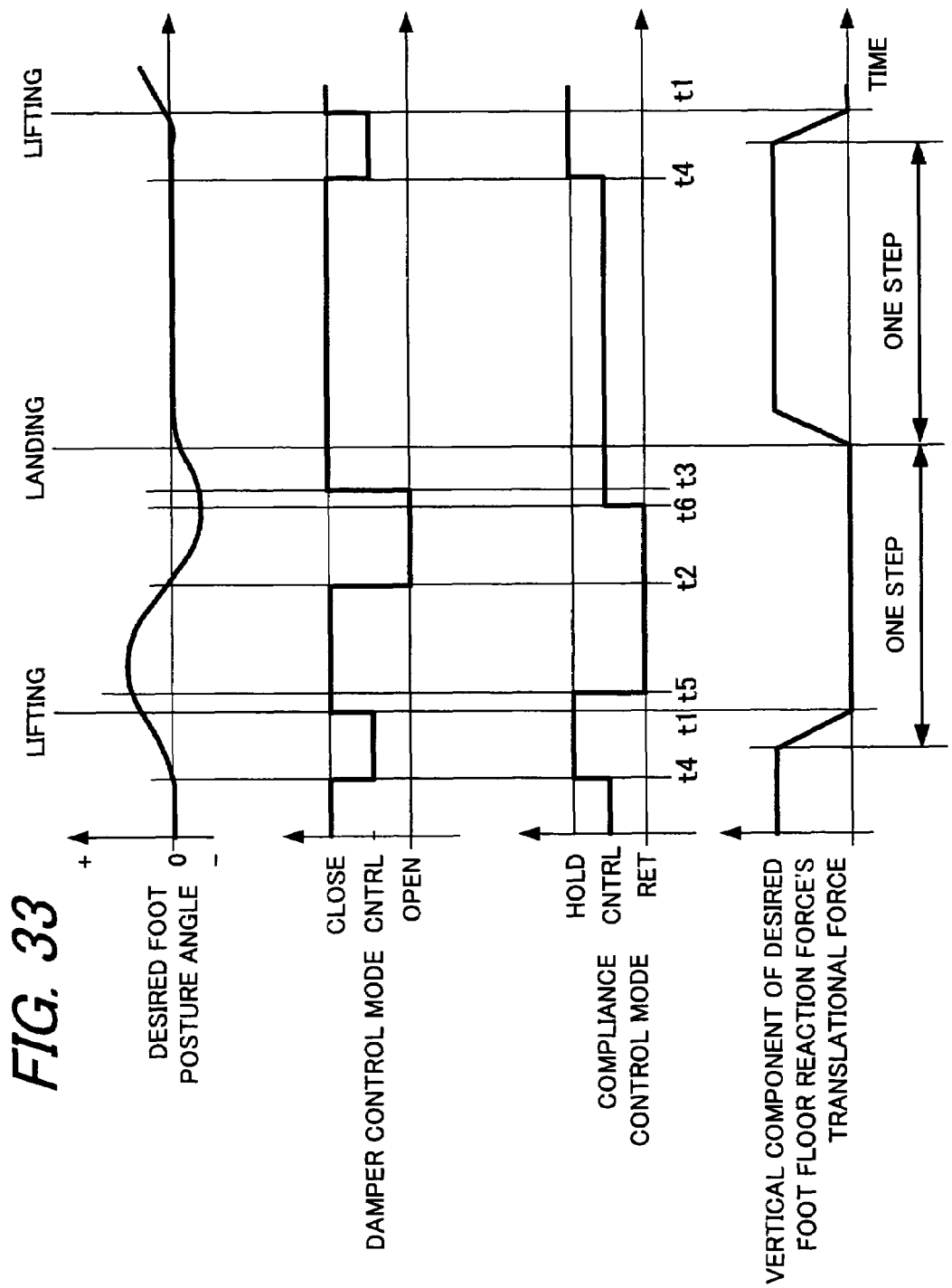
FIG. 33 is a time chart showing the transition of, inter alia, control mode of a legged mobile robot according to a seventh embodiment of the invention.

FIG. 33 is a time chart showing the transition of, inter alia, the control mode of the damper 50 according to the seventh embodiment.

As shown in FIG. 33, the damper control mode according to this embodiment comprises three types: "CLOSE," "CNTRL" and "OPEN." Further, as in the sixth embodiment, the compliance control mode comprises three types: "HOLD," ""CNTRL" and "RET."

An explanation regarding the points of difference from the sixth embodiment will be made in the following. FIG. 34 is a block diagram showing the damper 50 throttling control processing according to the seventh embodiment.

Figure 34:
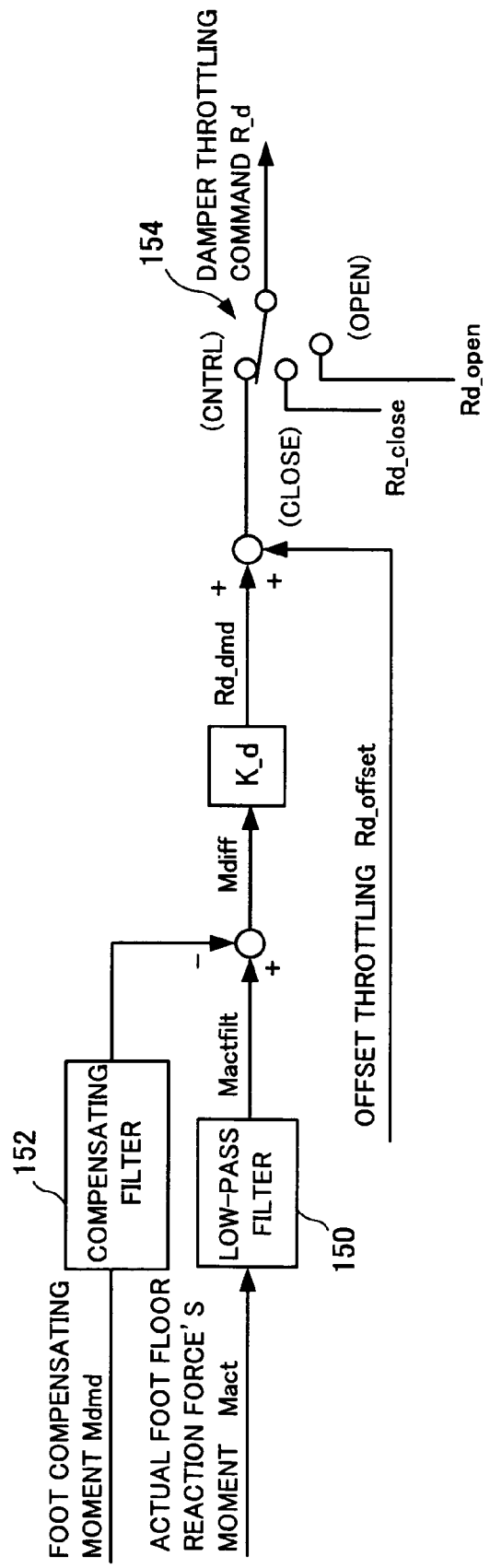
FIG. 34 is a block diagram showing the processing of throttling control of a damper according to the seventh embodiment.

As shown in FIG. 34, first, the actual foot floor reaction force's moment Mact is passed through a low-pass filter 150 for preventing oscillation to obtain Mactfilt. Further, the foot compensating moment Mdmd is passed through a compensating filter 152 for frequency response characteristic enhancement to subtract it from Mactfilt and obtain the deviational moment Mdiff.

Next, the deviational moment Mdiff is multiplied by K_d (control gain) to determine a damper throttling demand Rd_dmd and the value obtained by adding an offset throttling Rd_offset thereto is outputted to the damper 50 as a damper throttling command R_d.

Note that the foregoing is the processing when, as illustrated, "CNTRL" has been selected as the damper control mode (a select switch 154 is connected to the CNTRL side); and when "CLOSE" or "OPEN" has been selected, then similarly to in the first embodiment, Rd_close (bending angle holding command) or Rd_open (held bending angle releasing command) is outputted to the damper 50 through the select switch 154 as the damper throttling command R_d.

Further, although explanation will be omitted, the foot compensating angle determiner processing like that in FIG. 31 of the aforesaid sixth embodiment is also performed in the seventh embodiment.

To explain the FIG. 33 time chart in light of the foregoing, the control mode of the damper 50 is, as illustrated, set to "CNTRL" between the fourth time point t4 and first time point t1 of the next cycle (i.e., during the tiptoe standing period). Further, the compliance control mode is set to "HOLD" between the fourth time point t4 and fifth time point t5, which interval includes the tiptoe standing period. That is, during the tiptoe standing period, instead of conducting compliance control, the electromagnetic solenoid 50e is operated to vary the opening area of the orifice 50d, thereby regulating the damping characteristic of the damper 50 so as to regulate the bending angle of the toe 22t and thus control the floor reaction force's moment. As a result, similarly to in the sixth embodiment, posture stability during the tiptoe standing period can be further enhanced.

Note that explanation of the remainder of the configuration is omitted because it is the same as that of the earlier embodiments. However, similarly to in the sixth embodiment, the seventh embodiment also does not necessarily require the first time point t1 to be different between when the robot 1 is moving over flat terrain and when it is climbing stairs, because the configuration is such that the bending angle of the toe is regulated to control the floor reaction force's moment during the tiptoe standing period.

Further, although the seventh embodiment has been explained premised on the legged mobile robot according to the first embodiment, it can also be applied to the legged mobile robots of the other embodiments provided that the damper 50 is provided on the foot.

EIGHTH EMBODIMENT

A legged mobile robot and control system thereof according to an eighth embodiment of this invention will next be explained with reference to FIGS. 35 and 36. Note that the following explanation is premised on a legged mobile robot equipped with the foot 223 explained regarding the third embodiment.

As explained earlier, the damper 500 utilizes the flow resistance of a fluid. The flow resistance of a fluid depends on its flow velocity, and the flow velocity of the fluid in the damper 500 depends on the bending angular velocity of the toe 223t. That is, the damper 500 has a predetermined resistance characteristic set with respect to the bending angular velocity of the toe 223t. It can be said that the bending angle change of the toe 223t is suppressed in accordance with this resistance characteristic. In the eighth embodiment, therefore, the magnitude of the resistance produced by the damper 500 is varied by manipulating the position/posture of the foot 223 to regulate the bending angular velocity of the toe 223t, thereby controlling the floor reaction force's moment.

Figure 35:
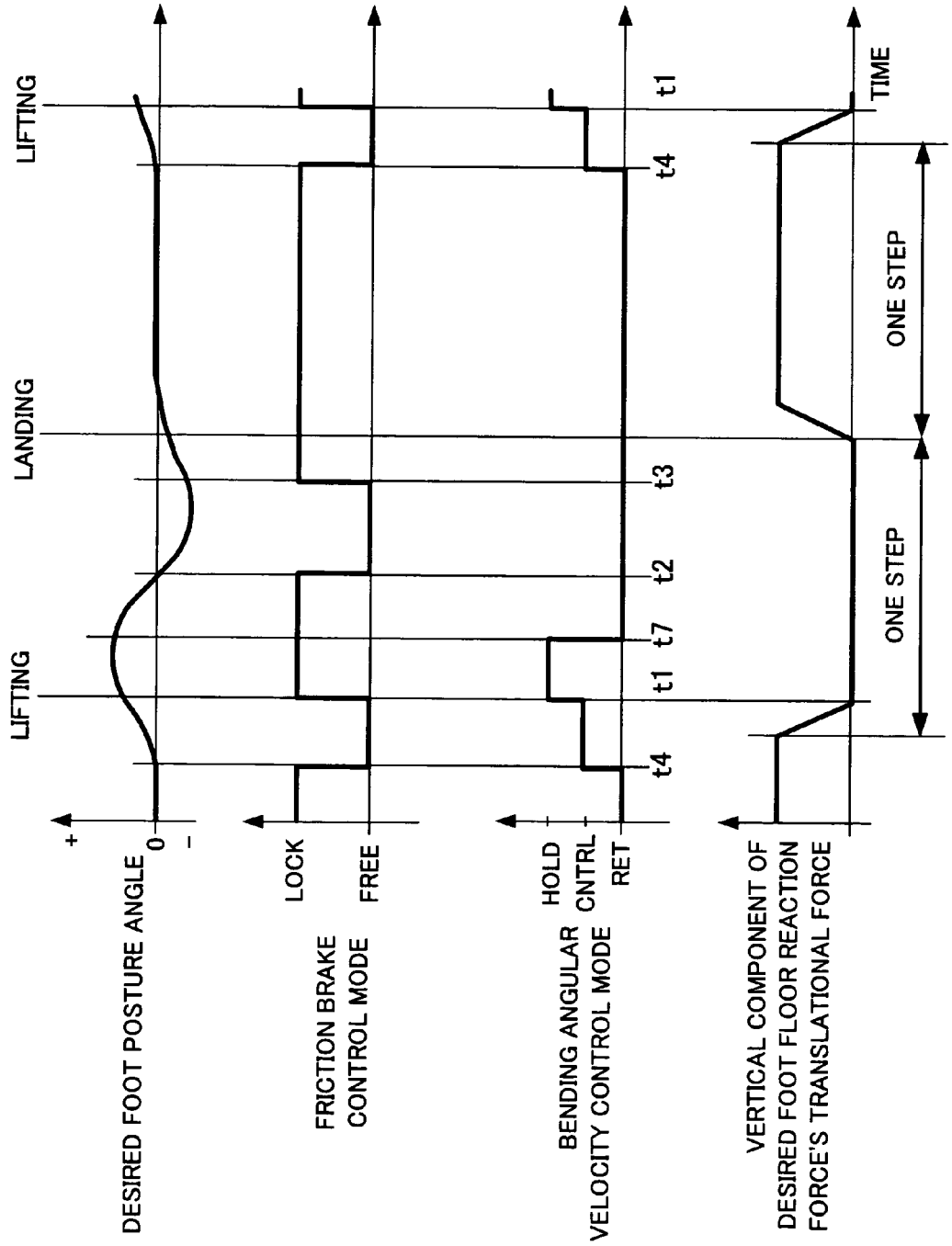
FIG. 35 is a time chart showing the transition of, inter alia, control mode of a legged mobile robot according to an eighth embodiment.

FIG. 35 is a time chart showing the transition of, inter alia, the control mode of the damper 500 according to the eighth embodiment.

As shown in FIG. 35, the bending angular velocity control mode (explained later) comprises three types: "HOLD," "CNTRL" and "RET."

Figure 36:
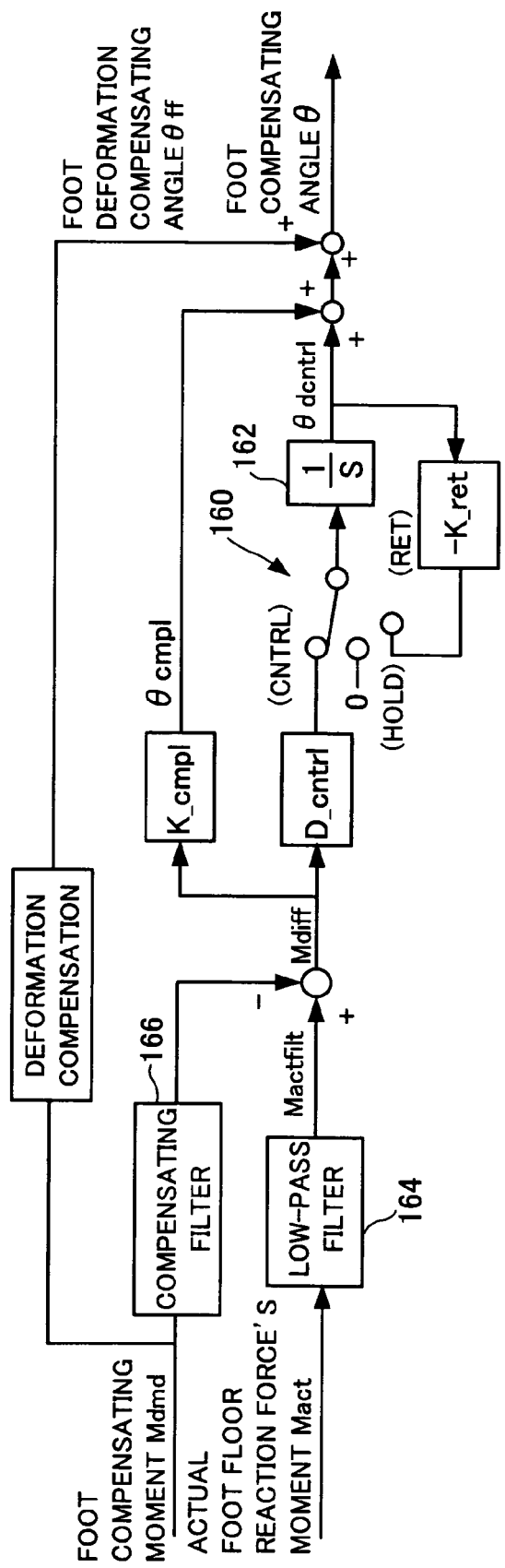
FIG. 36 is a block diagram showing the calculation processing of a foot compensating angle determiner of a legged mobile robot control system according to the eighth embodiment.

FIG. 36 is a block diagram showing the processing of the foot compensating angle determiner of the legged mobile robot control system according to the eighth embodiment. Note that for the same reason as in the sixth embodiment mentioning of the leg serial numbers (n: 1, 2) and X, Y is omitted in the following.

As shown in FIG. 36, the eighth embodiment is provided with a select switch 160 and the input to an integrator 162 is switched in accordance with the bending angle velocity control mode.

To begin with, an explanation will be made regarding the processing when "CNTRL" is selected as the bending angular velocity control mode (the select switch 160 is connected to the "CNTRL" side). First, the actual foot floor reaction force's moment Mact is passed through a low-pass filter 164 for preventing oscillation to obtain Mactfilt. Further, the foot compensating moment Mdmd is passed through a compensating filter 166 for frequency response characteristic enhancement to subtract it from Mactfilt and obtain the deviational moment Mdiff.

Then the value obtained by multiplying the deviational moment Mdiff by D_cntrl (control gain) is integrated by the integrator 162 to determine a damper control compensating angle θdcntrl. Further, the deviational moment Mdiff is multiplied by K_cmpl (control gain) to obtain the aforesaid compliance control compensating angle θcmpl.

Finally, the value obtained by adding together the damper control compensating angle θdcntrl and compliance control compensating angle θcmpl is, similarly to in the sixth embodiment, further added to the determined foot deformation compensating angle θff to obtain the foot compensating angle θ. The joint displacement of the robot 1 is manipulated based on this foot compensating angle θ so as to manipulate the position/posture of the foot 223, thereby varying the angular velocity of the foot 223 relative to the floor, i.e., regulating the bending angular velocity of the toe 223t to vary the magnitude of the resistance produced by the damper 500, and thus control the floor reaction force's moment. Note that rather than manipulating the joint displacement it is also acceptable to manipulate the position/posture of the foot 223 by manipulating the robot 1 gait itself.

Next, an explanation will be made regarding the processing when "RET" is selected as the bending angular velocity control mode. When "RET" is selected as the bending angular velocity control mode, the select switch 160 is connected to the RET side, so that the value obtained by multiplying the damper control compensating angle θdcntrl by −K_ret is inputted to the integrator 162. As a result, the change rate of the damper control compensating angle θdcntrl becomes −K_ret*θdcntrl. That is, the damper control compensating angle θdcntrl gradually returns to zero by the step response of a first-order delay system of time constant 1/K_ret.

On the other hand, when "HOLD" is selected as the bending angular velocity control mode, the select switch 160 is connected to the HOLD side, so that zero is inputted to the integrator 162. That is, the value up to then is held as the damper control compensating angle θdcntrl.

Note that explanation regarding the hydraulic control of the friction brake 60 is omitted because it is the same as that of the third embodiment (FIG. 20).

To explain the FIG. 35 time chart in light of the foregoing, "CNTRL" is selected as the bending angular velocity control mode between the fourth time point t4 and first time point t1 of the next cycle (i.e., during the tiptoe standing period). Further, "HOLD" is selected between the first time point t1 and seventh time point t7 during swing. Further, "RET" is selected between the seventh time point t7 and fourth time point t4 (i.e., from before landing of the leg 2 to completion of flat ground contact (start of tiptoe standing)).

During the tiptoe standing period in which "CNTRL" is selected as the bending angular velocity control mode, "FREE" is selected as the friction brake control mode and the toe 223t is made bendable. That is, during this period the position/posture of the foot 223 is varied to regulate the bending angular velocity of the toe 223t, thereby manipulating the magnitude of the resistance produced by the damper 500 to control the floor reaction force's moment. As a result, posture stability during the tiptoe standing period can be further enhanced.

Note that explanation of the remainder of the configuration is omitted because it is the same as that of the earlier embodiments. However, similarly to in the sixth embodiment, the eighth embodiment also does not necessarily require the first time point t1 to be different between when the robot 1 is moving over flat terrain and when it is climbing stairs, because the configuration is such that the bending angle of the toe is regulated to control the floor reaction force's moment during the tiptoe standing period.

Further, although the eighth embodiment has been explained premised on the legged mobile robot according to the third embodiment, it can also be applied to the legged mobile robots of the other embodiments that are equipped on the foot with the damper 50 (damper with electromagnetic solenoid).

NINTH EMBODIMENT

A legged mobile robot and control system thereof according to a ninth embodiment of this invention will next be explained with reference to FIG. 37.

The ninth embodiment is what is obtained by applying to the legged mobile robot according to the fifth embodiment, which is equipped with the sensor for detecting the toe bending angle, the technique set out in Japanese Laid-open Patent Application 2000-147948 proposed earlier by the applicant (technique for estimating floor shape) and the control explained in the sixth embodiment.

FIG. 37 is a block diagram showing the processing of the foot compensating angle determiner of the legged mobile robot control system according to the ninth embodiment. Note that for the same reason as in the sixth embodiment mentioning of the leg serial numbers (n: 1, 2) and X, Y is omitted in the following.

As shown in FIG. 37, the ninth embodiment has a floor shape estimator 170 incorporated in the foot compensating angle determiner described in the sixth embodiment (shown affixed with the same symbols as the sixth embodiment).

The processing shown in FIG. 37 will be explained in the following: to the sum of the compliance control compensating angle θcmpl and foot deformation compensating angle θff calculated by processing similar to that of the sixth embodiment is further added with an estimated foot floor inclination deviation θfestm outputted from the floor shape estimator 170, thereby determining the foot compensating angle θ.

The floor shape estimator 170 is inputted with, in addition to the foot compensating angle θ determined in the foregoing manner, the actual foot floor reaction force Fact, Mact, the body inclination angle error θerr, the bending angle of the toe 22t detected by the stroke sensor 22s or rotation angle sensor 222s, and so forth. Based on these, the floor shape estimator 170 calculates and outputs a floor shape estimated value (specifically, an estimated foot floor inclination difference θfestm and an estimated foot-to-foot floor inclination difference θfdbestmv to be used for calculating the feet compensating angle θdbv mentioned in the first embodiment). Note that explanation regarding the operation of the floor shape estimator 170 is omitted because it is elaborately covered in the aforesaid Japanese Laid-open Patent Application 2000-147948.

Thus in the ninth embodiment the floor shape estimated value is calculated based on the toe bending angle and the like and the value is added as a parameter used to calculate the foot compensating angle θ (and the feet compensating angle θdbv). More generally, the shape of the floor on which the robot 1 walks is estimated, and the bending angle change suppressor is operated based on the estimated floor shape etc. so as to control the floor reaction force's moment. As a result, stability during the tiptoe standing period can be further enhanced. Further, performance at higher accuracy than by ordinary compliance control is possible.

Note that although in the ninth embodiment the floor shape estimator 170 is incorporated in the foot compensating angle determiner explained in the sixth embodiment, it is also acceptable to incorporate it in the foot compensating angle determiners explained in the other embodiments.

In the first to ninth embodiments of this invention are configured to have a legged mobile robot (1) having a body (24) and legs (2R, 2L) whose upper ends are connected to the body and whose lower ends are each connected to a foot (22, 222, 223, 224) to be movable when the legs are driven, characterized in that the foot comprises a foot main body (22m, 222m, 223m, 224m) connected to each of the legs, a toe (22t, 222t, 223t, 224t) provided at a fore end of the foot main body to be bendable with respect to the foot main body, and a bending angle holder (damper 50, friction brake 60) capable of holding a bending angle (θt) of the toe in a bendable range of the toe from zero degree at which a contact area of the foot becomes maximum to a predetermined degree, the bending angle holder holding the toe at the bending angle (θt) comprising one from among the zero degree, the predetermined degree and an arbitrary angle between the zero degree and the predetermined angle.

Further, they are configured to further include a bending angle change suppressor (damper 50, damper 500, friction brake 60) that suppresses change of the bending angle of the toe.

Further, the first embodiment and the third to ninth embodiments are configured such that the toe (22t, 223t, 224t) is made continuous with the foot main body (22m, 223m, 224m) and is made of an elastic material that bends with flexing.

Further, the second to ninth embodiments are configured such that the toe (222t, 223t, 224t) is connected to the fore end of the foot main body through a rotational shaft (222a) capable of rotating about a pitch axis.

Further, the second to ninth embodiments are configured to further include an urging means (restoring spring 222b) for urging the toe in a direction of restoring it to an initial position.

Further, the third to sixth embodiments are configured such that the bending angle holder comprises a friction brake (60).

Further, the first, second, third, fifth, seventh, eighth and ninth embodiments are configured such that the bending angle change suppressor comprises a damper (50, 500).

Further, the fourth, sixth and ninth embodiments are configured such that the bending angle holder and the bending angle change suppressor comprise a friction brake (60) whose frictional force is made adjustable.

Further, the first, second fifth, seventh and ninth embodiments are configured such that the bending angle holder and the bending angle change suppressor comprise a damper (50).

Further, the first to ninth embodiments are configured to have a system for controlling a legged mobile robot having a body (24) and legs (2R, 2L) whose upper ends are connected to the body and whose lower ends are each connected to a foot (22, 222, 223, 224) to be movable when the legs are driven, the foot having a foot main body (22m, 222m, 223m, 224m) connected to each of the legs and a toe (22t, 222t, 223t, 224t) provided at a fore end of the foot main body to be bendable with respect to the foot main body, characterized by a bending angle holder (damper 50, friction brake 60) capable of holding a bending angle (θt) of the toe in a bendable range of the toe, and a bending angle controlling means (control unit 26) for operating the bending angle holder to control holding and releasing of the bending angle of the toe, the bending angle controlling means holding the bending angle of the toe at a first time point (t1) which is a liftoff time of the leg from a floor or earlier thereof, and releasing the held bending angle of the toe at a second time point (t2) after the leg has lifted off the floor to restore the toe to a initial position.

Further, the first to fourth embodiments and the sixth to ninth embodiments are configured to further include a gait generating means (gait generator 100) for generating a gait of the robot, and the bending angle controlling means determines the first time point and the second time point based on the generated gait.

Further, the fifth to ninth embodiments are configured to further include a bending angle detecting means (stroke sensor 22s, rotation angle sensor 222s) for detecting the bending angle of the toe (22t, 222t), and a gait generating means (gait generator 100) for generating a gait of the robot, and the bending angle controlling means determines the first time point based on the detected bending angle and determines the second time point based on the generated gait.

Further, the first to ninth embodiments are configured such that the bending angle controlling means holds the bending angle of the toe at a third time point (t3) during liftoff of the leg from the floor, which is later than the second time point, and releasing the held bending angle of the toe at a fourth time point (t4), after the leg has landed on the floor, which is earlier than the first time point at a next time.

Further, the first to fourth embodiments and the sixth to ninth embodiments are configured to further include a gait generating means (gait generator 100) for generating a gait of the robot, and the bending angle controlling means determines the first to fourth time points based on the generated gait.

Further, the fifth to ninth embodiments are configured to further include a bending angle detecting means (stroke sensor 22s, rotation angle sensor 222s) for detecting the bending angle of the toe (22t, 222t), and a gait generating means (gait generator 100) for generating a gait of the robot and the bending angle controlling means determines the first and third time points based on the detected bending angle, and determines the second and fourth time points based on the generated gait.

Further, the fourth embodiment is configured to further include a bending angle change suppressor (friction brake 60) that suppresses change of the bending angle of the toe (224t), and the bending angle controlling means releases the held bending angle of the toe at the second time point to gradually restore the toe to the initial position by operating the bending angle change suppressor to reduce the bending angle progressively.

Further, the six, seventh and ninth embodiments are configured to further include a bending angle change suppressor (damper 50, friction brake 60) that suppresses change of the bending angle of the toe, and the bending angle controlling means operates the bending angle change suppressor from the fourth time point to the first time point at the next time to control a floor reaction force (floor reaction force's moment) acting to the robot through the foot.

Further, the eighth embodiment is configured to further include a bending angle change suppressor (damper 500) that suppresses change of the bending angle of the toe in accordance with a predetermined resistance characteristic set with respect to angular velocity of the bending angle, and the bending angle controlling means manipulates a position or posture of the foot (22R(L)) from the fourth time point to the first time point at the next time to regulate the bending angular velocity of the toe, thereby varying magnitude of resistance produced by the bending angle change suppressor to control a floor reaction force (floor reaction force's moment) acting to the robot through the foot.

Further, the ninth embodiment is configured to further include a bending angle change suppressor (damper 50, friction brake 60) that suppresses change of the bending angle of the toe; a bending angle detecting means (stroke sensor 22s, rotation angle sensor 222s) for detecting the bending angle of the toe, and a floor shape estimating means (floor shape estimator 170) for estimating shape of the floor on which the foot is based on at least the detected bending angle, and the bending angle controlling means operates the bending angle change suppressor from the fourth time point to the first time point at the next time based on at least the estimated shape of the floor to control a floor reaction force (floor reaction force's moment) acting to the robot through the foot.

Note that although in the foregoing the compliance mechanism 42R(L) required for cushioning impact at floor contact and enhancing control performance is constituted of the spring mechanism unit 38R(L) and sole 40R(L), it is also possible, for example, to provide a leaf spring on the bottom of the foot and utilize its elasticity. As the material of the leaf spring, carbon or the like imparted with elasticity is preferable from the viewpoint of weight reduction.

Further, although a damper and a friction brake have been given as examples of the bending angle holder for holding the bending angle of the toe and the bending angle change suppressor for suppressing the bending angle change, they are of course not limited to these. For example, it is possible to use a ratchet mechanism as the bending angle holder. When a damper or friction brake is used as the bending angle holder, the bending angle can be held anywhere in the continuum of angles within the movable range of the toe. In contrast, in the case of a ratchet mechanism, the angle is held at any among multiple angles corresponding to the number of gears of the ratchet (i.e., holding within the range of the ratchet feed angle is not possible, so that the angles the ratchet mechanism can hold are not continuous), but there is the merit of no operation being necessary at the time of holding the bending angle.

INDUSTRIAL APPLICABILITY

According to this invention, in a legged mobile robot, the configuration is such that each foot comprises a foot main body and a bendable toe provided at the fore end of the foot main body, and a bending angle holder capable of holding the bending angle of the toe is provided. Further, in a control system of the legged mobile robot, the configuration is such that the bending angle of the toe is held at a first time point at the liftoff time of the leg or prior thereto and the toe is restored to the initial position at a second time point after the leg lifts off. As a result, the bending angle at the time of liftoff can continue to be held even after the leg lifts off, whereby the posture can be prevented from becoming unstable owing to the toe contacting the floor immediately after liftoff. Further stability during tiptoe standing can be enhanced.

The invention claimed is:

1. A legged mobile robot having a body and legs whose upper ends are connected to the body and whose lower ends are each connected to a foot to be movable when the legs are driven, wherein the foot comprises:
a foot main body connected to each of the legs;
a toe provided at a fore end of the foot main body to be bendable with respect to the foot main body; and
a bending angle holder capable of holding a bending angle of the toe in a bendable range from zero degree at which a contact area of the foot becomes maximum to a predetermined degree, the bending angle holder holding the toe at the bending angle comprising one from among the zero degree, the predetermined degree and an arbitrary angle between the zero degree and the predetermined angle.

2. The legged mobile robot according to claim 1, further including;
a bending angle change suppressor that suppresses change of the bending angle of the toe.

3. The legged mobile robot according to claim 1, wherein the toe is made continuous with the foot main body and is made of an elastic material that bends with flexing.

4. The legged mobile robot according to claim 1, wherein the toe is connected to the fore end of the foot main body through a rotational shaft capable of rotating about a pitch axis.

5. The legged mobile robot according to claim 4, further including:
an urging means for urging the toe in a direction of restoring it to an initial position.

6. The legged mobile robot according to claim 1, wherein the bending angle holder comprises a friction brake.

7. The legged mobile robot according to claim 2, wherein the bending angle change suppressor comprises a damper.

8. The legged mobile robot according to claim 2, wherein the bending angle holder and the bending angle change suppressor comprise a friction brake whose frictional force is made adjustable.

9. The legged mobile robot according to claim 2, wherein the bending angle holder and the bending angle change suppressor comprise a damper.

* * * * *

UNITED STATES PATENT AND TRADEMARK OFFICE
CERTIFICATE OF CORRECTION

PATENT NO.        : 7,530,410 B2                                  Page 1 of 1
APPLICATION NO.   : 10/593493
DATED             : May 12, 2009
INVENTOR(S)       : Takenaka et al.

It is certified that error appears in the above-identified patent and that said Letters Patent is hereby corrected as shown below:

Column 30,

Claim 1, line 6, change "bendable range from" to --bendable range of the toe from--

Signed and Sealed this

Twenty-first Day of July, 2009

JOHN DOLL
*Acting Director of the United States Patent and Trademark Office*